(12) United States Patent
Naftalovich et al.

(10) Patent No.: US 11,204,511 B2
(45) Date of Patent: Dec. 21, 2021

(54) PROGRESSIVE OPTICAL DESIGNS FOR DIFFERENT ADD POWERS

(71) Applicant: SHAMIR OPTICAL INDUSTRY LTD., Kibbutz Shamir (IL)

(72) Inventors: Raanan Moshe Naftalovich, San Diego, CA (US); Riki Atias, Mishmar Hayarden (IL); Alex Shur, Haifa (IL)

(73) Assignee: Shamir Optical Industry Ltd., Kibbutz Shamir (IL)

( * ) Notice: Subject to any disclaimer, the term of this patent is extended or adjusted under 35 U.S.C. 154(b) by 0 days.

(21) Appl. No.: 16/867,029

(22) Filed: May 5, 2020

(65) Prior Publication Data

US 2020/0264452 A1     Aug. 20, 2020

Related U.S. Application Data

(63) Continuation of application No. 16/137,465, filed on Sep. 20, 2018.

(60) Provisional application No. 62/720,878, filed on Aug. 21, 2018, provisional application No. 62/765,304, filed on Aug. 20, 2018, provisional application No. 62/720,093, filed on Aug. 20, 2018.

(51) Int. Cl.
    *G02C 7/06*     (2006.01)

(52) U.S. Cl.
    CPC .................................. *G02C 7/066* (2013.01)

(58) Field of Classification Search
    CPC .......... G02C 7/06; G02C 7/061; G02C 7/063; G02C 7/065; G02C 7/066; G02C 2202/08; G02C 7/068; G02C 7/024; G02C 7/028

USPC ....................... 351/159.061, 159.42
See application file for complete search history.

(56) References Cited

U.S. PATENT DOCUMENTS

| | | | | |
|---|---|---|---|---|
| 5,488,442 | A | * | 1/1996 | Harsigny ............... G02C 7/061 351/159.42 |
| 5,726,734 | A | * | 3/1998 | Winthrop ............... G02C 7/061 351/159.42 |
| 5,861,935 | A | | 1/1999 | Morris et al. |
| 6,793,340 | B1 | | 9/2004 | Morris et al. |
| 7,066,597 | B2 | | 6/2006 | Miller et al. |
| 7,837,325 | B2 | | 11/2010 | Wooley et al. |
| 2003/0117578 | A1 | | 6/2003 | Haimerl et al. |

(Continued)

FOREIGN PATENT DOCUMENTS

WO     WO 2020/041215     2/2020

OTHER PUBLICATIONS

International Search Report and Written Opinion issued in PCT Application No. PCT/US2019/047105, dated Nov. 15, 2019, in 17 pages.

*Primary Examiner* — Travis S Fissel
(74) *Attorney, Agent, or Firm* — Knobbe, Martens, Olson & Bear, LLP

(57) ABSTRACT

Progressive lenses designs are disclosed having optical parameters such as the width of a far vision zone, the width of a near vision zone, the width of a corridor, the maximum residual cylinder, the maximum gradient of residual cylinder, that vary with addition. Such lens designs may provide improved performance for individuals requiring different amounts of addition (such as individuals having different ages) who spend more time performing different types of activities such as viewing hand-held devices like smart phones and tablets or reading books.

16 Claims, 14 Drawing Sheets

(56) References Cited

U.S. PATENT DOCUMENTS

2007/0008489 A1\* 1/2007 Guillous ................ G02C 7/065
351/159.46

\* cited by examiner

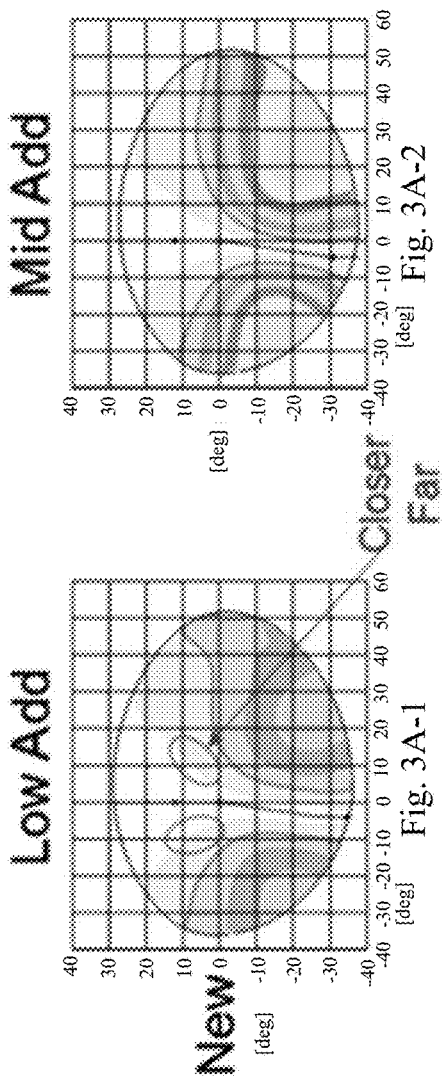
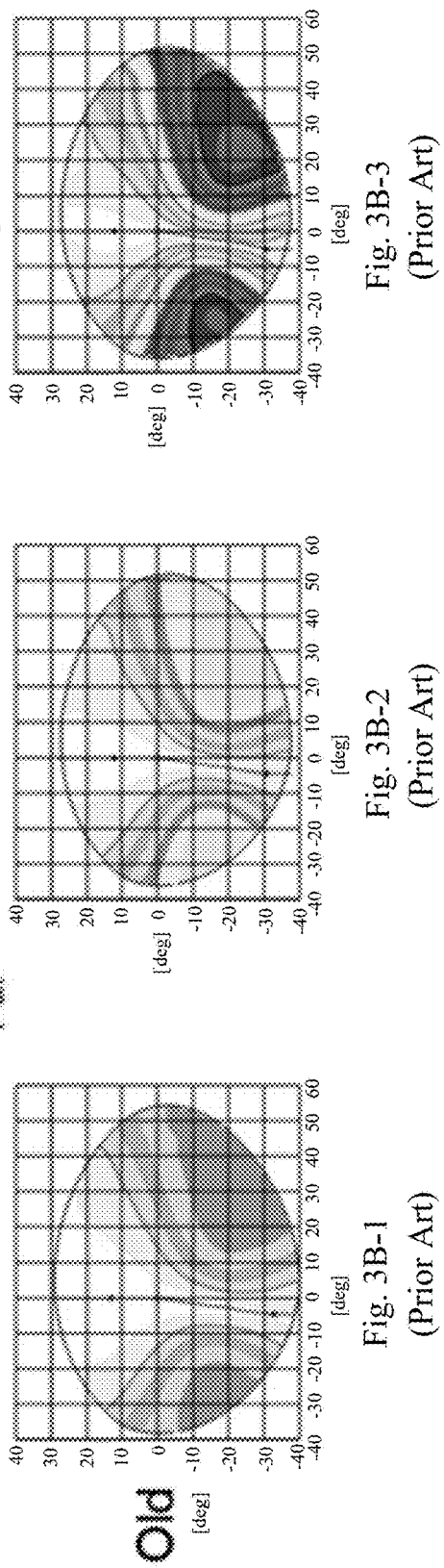
Fig. 3A-1  Fig. 3A-2  Fig. 3A-3
Fig. 3B-1 (Prior Art)  Fig. 3B-2 (Prior Art)  Fig. 3B-3 (Prior Art)

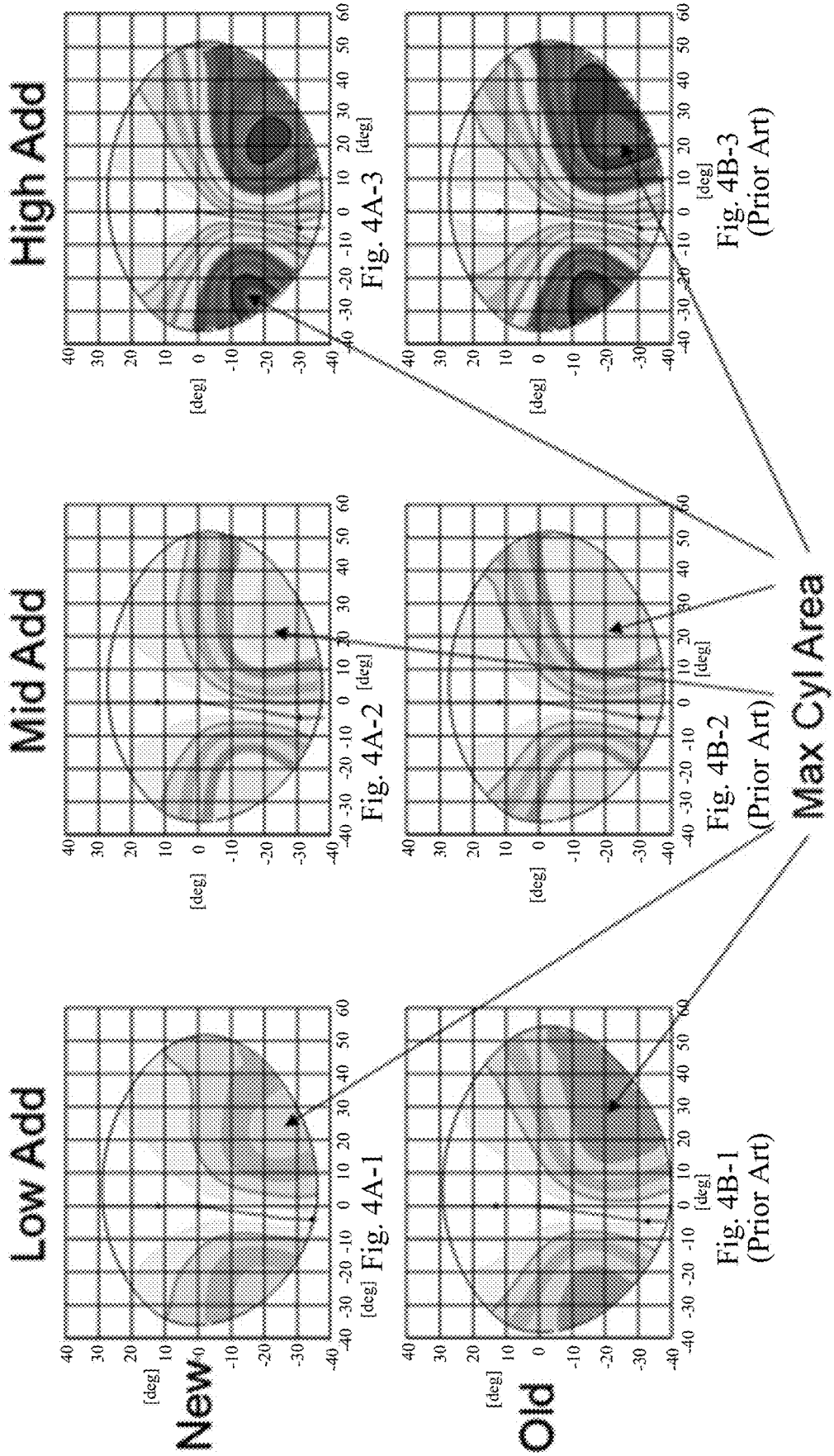

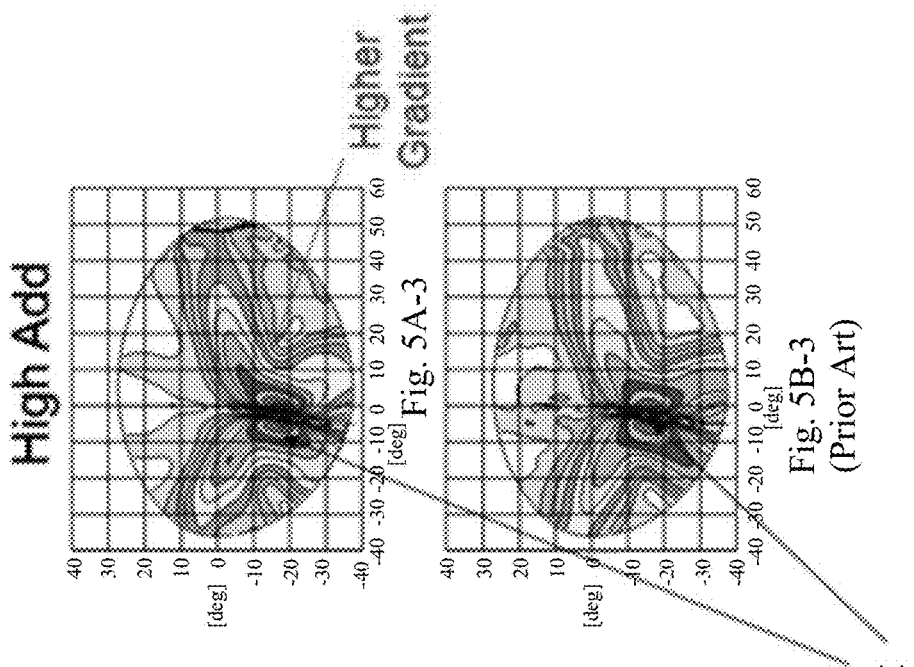
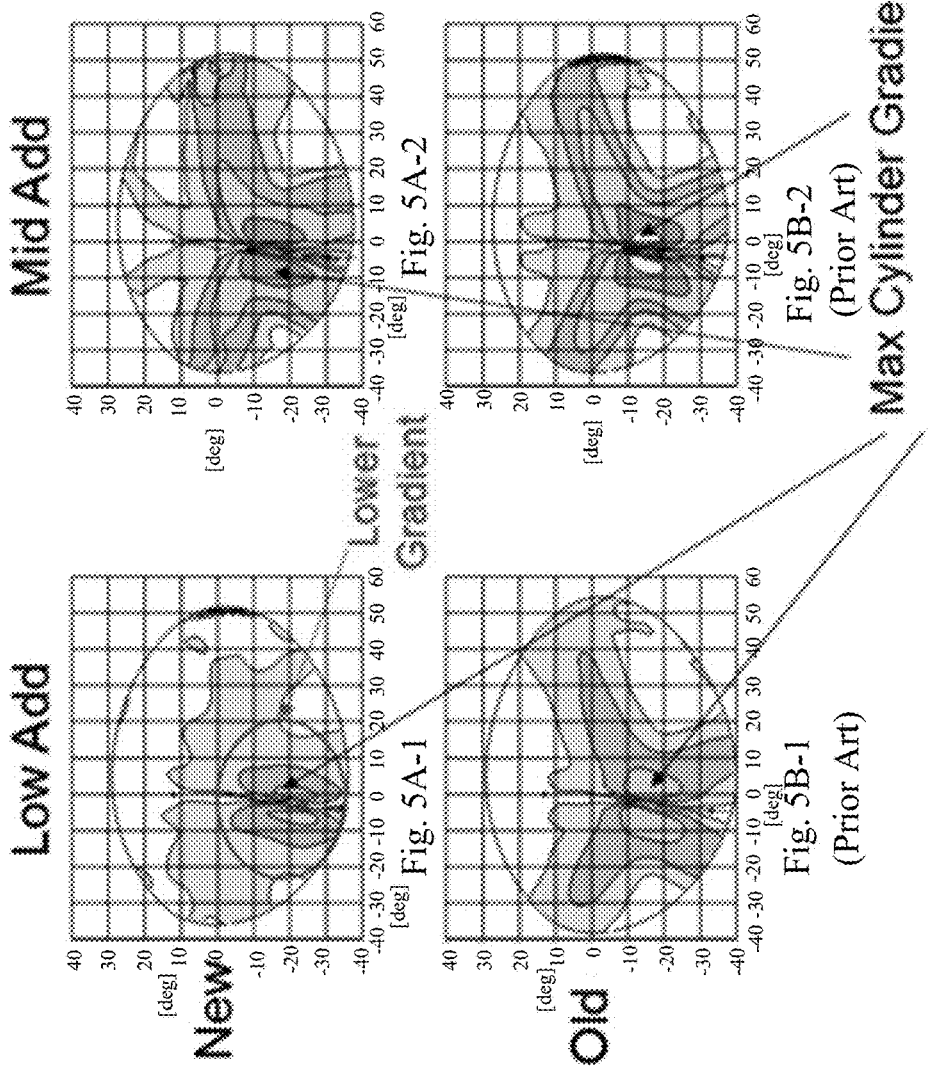
Fig. 5A-1 / Fig. 5A-2 / Fig. 5A-3
Fig. 5B-1 (Prior Art) / Fig. 5B-2 (Prior Art) / Fig. 5B-3 (Prior Art)

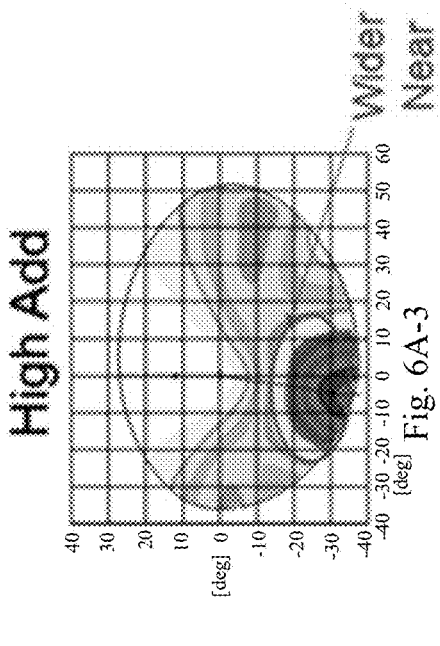
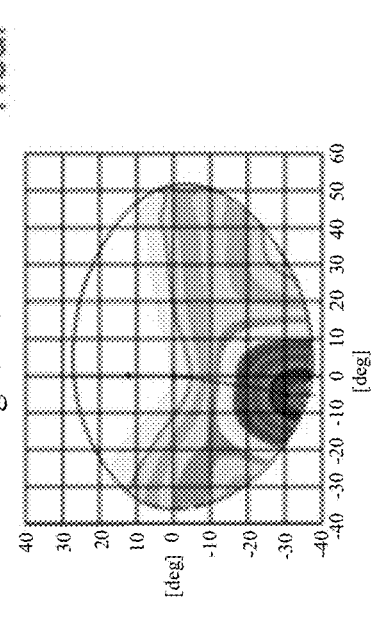
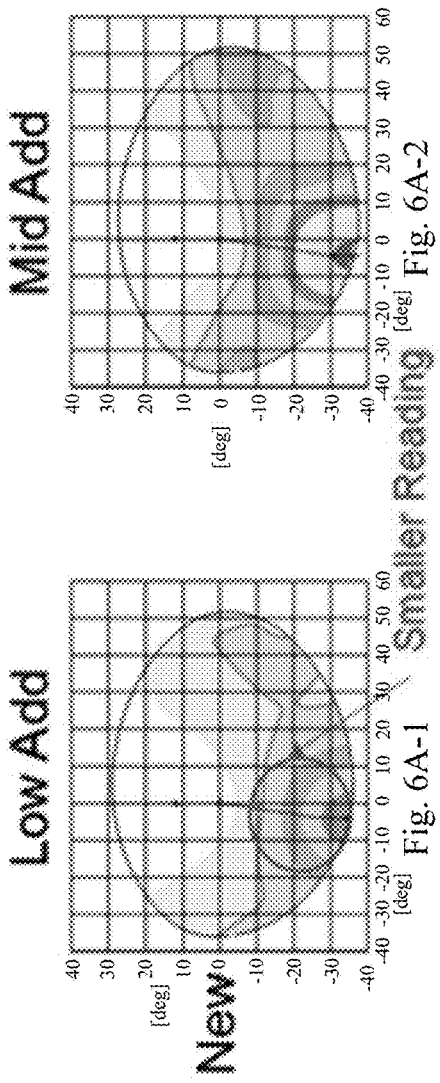
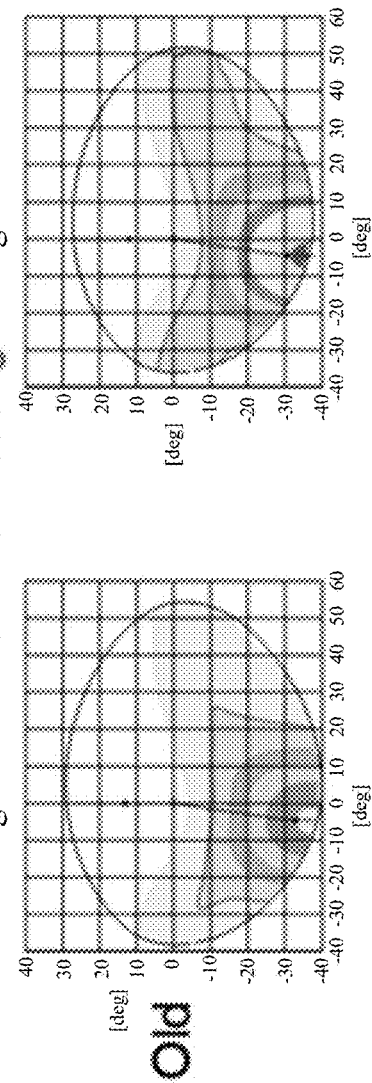
Fig. 6A-1   Fig. 6A-2   Fig. 6A-3
Fig. 6B-1 (Prior Art)   Fig. 6B-2 (Prior Art)   Fig. 6B-3 (Prior Art)

PROGRESSIVE OPTICAL DESIGNS FOR DIFFERENT ADD POWERS

CROSS-REFERENCE TO RELATED APPLICATIONS

This application is a continuation of U.S. patent application Ser. No. 16/137,465, filed Sep. 20, 2018, which claims benefit under 35 U.S.C. § 119(e) of U.S. Provisional Application No. 62/765,304, filed on Aug. 20, 2018, titled "Progressive Optical Designs for Different Add Powers;" U.S. Provisional Application No. 62/720,093, filed on Aug. 20, 2018, titled "Progressive Optical Designs for Different Add Powers;" and U.S. Provisional Application No. 62/720,878, filed on Aug. 21, 2018, titled "Progressive Optical Designs for Different Add Powers." The disclosure of each of the above identified applications is incorporated by reference herein in their entirety.

BACKGROUND OF THE INVENTION

Field of the Invention

This description relates generally to ophthalmic lenses used in eyewear that provide near vision as well as distance vision correction such as progressive lenses.

Description of the Related Art

One of the most common visual defects in individuals of different ages are refractive errors. Refractive errors include (i) myopia or near-sightedness, a condition in which objects at a far distance (e.g., at a distance greater than 20 feet) appear blurred; (ii) hyperopia or farsightedness in which in which objects at a near distance (e.g., at a distance less than 2 feet) appear blurred; (iii) astigmatism in which objects at near distance, far distance as well as intermediate distance appear blurred; and (iv) presbyopia that includes loss of the ability of the eye to focus on near objects, often referred to as accommodation. These and other refractive errors can be corrected, for example, by ophthalmic lenses such as those used in eyeglasses.

Individuals suffering from hyperopia/myopia that also suffer from presbyopia may use a first pair of ophthalmic lenses that provide distance vision and a second pair of ophthalmic lenses that provide near vision. Alternatively, bifocal lenses having separate visual zones can correct both near and far vision with the same lens. Additionally, progressive lenses having different visual zones that provide refractive error correction for near, intermediate and far vision can also be beneficial for presbyopic individuals. Bifocal lenses and progressive lenses can eliminate the need for separate pairs of ophthalmic lenses for viewing objects at near and far distances.

SUMMARY OF THE INVENTION

A progressive lens may comprise a first optical zone that provides far or distance vision correction and a second optical zone that provides near vision correction. A corridor connects the first and the second optical zones. The optical power of the near is larger than the optical power of the far, the difference being referred to as the addition or add. The optical power in the corridor can gradually increase as the gaze moves from the first "far" optical zone to the second "near" optical zone. Accordingly, a wearer views distance objects through the far optical zone and views near objects through the near optical zone. When transitioning between the viewing distant object to viewing near object, the wearer's gaze moved from viewing through the far optical zone to viewing through the near optical zone by translating their gaze through the corridor. Objects at intermediate distances between far and near distance can be resolved when viewed through the corridor.

This application discloses an innovative lens design and method of dispensing progressive lenses for individuals having different prescriptions wherein various parameters (e.g., widths) of the far optical zone, the near optical zone or the corridor of progressive lenses, or any combination thereof, or variations thereof are determined based on the add power. In particular, one or more parameters of the far optical zone, the near optical zone and the corridor, when normalized to the add power, can vary based on the add power. Other parameters such as, for example, maximum residual cylinder or maximum gradient of the residual cylinder normalized to the add power may also vary based on the add power. The innovative methods of designing the progressive lenses are described in further detail below.

The systems, methods and devices disclosed herein each have several innovative aspects, no single one of which is solely responsible for the desirable attributes disclosed herein. A variety of example systems and methods are provided below.

EXAMPLE 1

A method of producing a progressive ophthalmic lens having a far vision zone, a near vision zone and a corridor connecting the near and far optical zones, said method comprising:
receiving a prescription including an optical add power for an individual; and
selecting at least one optical design parameter of a surface of the progressive ophthalmic lens based on add power,
wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 2

The method of Example 1, wherein the method further comprises fabricating the progressive ophthalmic lens having the selected at least one optical design parameter.

EXAMPLE 3

The method of any of Examples 1-2, wherein a progressive ophthalmic lens configured to provide add power less than 2.0 D has a normalized corridor width that is greater than a normalized corridor width of another progressive ophthalmic lens configured to provide add power greater than 2.0 D, wherein the normalized corridor width corresponds to the minimum width of the corridor between cylinder isolines corresponding to 25% of the optical add power.

EXAMPLE 4

The method of any of Examples 1-2, wherein a progressive ophthalmic lens configured to provide add power greater than 2.0 D has a normalized near zone power width that is about 7%-20% larger than the near zone width of another progressive ophthalmic lens configured to provide add power less than 2.0 D, wherein the normalized near zone power width corresponds to a horizontal width of the near zone between add power isolines at 75% of the prescribed add power.

EXAMPLE 5

The method of any of Examples 1-2 and 4, wherein a progressive ophthalmic lens configured to provide add power greater than 2.0 D has a normalized maximum cylinder power that is about 15%-35% larger than the normalized maximum cylinder power of another progressive ophthalmic lens configured to provide add power less than 2.0 D.

EXAMPLE 6

The method of any of Examples 1-5, wherein the at least one optical design parameter comprises a normalized width of the corridor.

EXAMPLE 7

The method of any of Examples 1-7, wherein the at least one optical design parameter comprises a normalized power width of the near vision zone.

EXAMPLE 8

The method of any of Examples 1-8, wherein the maximum cylinder power gradient per add power increases linearly with add power between 1.0 D and 3.0 D.

EXAMPLE 9

A lens kit comprising:
at least two lenses belonging to a single lens design, each of the at least two lens comprising:
a far vision zone;
a near vision zone configured to provide an add power; and
a corridor connecting the far vision zone and the near vision zone
wherein the at least two lenses provide different add powers, and
wherein a normalized width of the corridor changes with the add power, wherein the normalized corridor width corresponds to the minimum width of the corridor between cylinder isolines corresponding to 25% of the optical add power.

EXAMPLE 10

The lens kit of Example 9, wherein the normalized width of the corridor of a first lens of the at least two lenses having a first add power is greater than the normalized width of the corridor of a second lens of the at least two lenses having a second add power greater than the first add power.

EXAMPLE 11

The lens kit of Example 10, wherein the first lens of the at least two lenses has an add power less than 2.0 D and a normalized corridor width between 6-8 degrees of field of view (FOV).

EXAMPLE 12

The lens kit of any of Examples 10-11, wherein the first lens of the at least two lenses has an add power less than 2.0 D and a normalized corridor width between 3-4 mm.

EXAMPLE 13

The lens kit of any of Examples 10-12, wherein the second lens of the at least two lenses has an add power greater than 2.0 D and a normalized corridor width between 5-6.5 degrees of field of view (FOV).

EXAMPLE 14

The lens kit of any of Examples 10-13, wherein the second lens of the at least two lenses has an add power greater than 2.0 D and a normalized corridor width between 2.5 mm and 3.25 mm.

EXAMPLE 15

The lens kit of any of Examples 9-14, wherein a normalized width of the far vision zone changes with add power.

EXAMPLE 16

The lens kit of Example 15, wherein a normalized width of the far vision zone increases with add power.

EXAMPLE 17

The lens kit of any of Examples 9-14, wherein a normalized width of the near vision zone changes with add power.

EXAMPLE 18

The lens kit of Example 17, wherein a normalized width of the near vision zone increases with add power.

EXAMPLE 19

The lens kit of any of Examples 9-14, wherein a normalized power width of the near vision zone increases with add power.

EXAMPLE 20

A lens kit comprising:
at least two progressive lenses each comprising:
a far vision zone;
a near vision zone configured to provide an add power; and
a corridor connecting the far vision zone and the near vision zone
wherein the at least two progressive lenses provide different add powers, and
wherein a normalized maximum gradient of residual cylinder power is less than 0.06 Diopter per degree of field of view (FOV) for lenses with add power between 1.0 D and 1.5 D, wherein the normalized maximum gradient of residual cylinder power corresponds to maximum gradient of cylinder power divided by the add power.

EXAMPLE 21

The lens kit of Examples 20, wherein the normalized maximum gradient of residual cylinder power is at least 0.06 Diopter per degree of field of view (FOV) for lenses with add power of 2.5 D.

EXAMPLE 22

The lens kit of Examples 21, wherein the normalized maximum gradient of residual cylinder power is at least 0.065 Diopter per degree of field of view (FOV) for lenses with add power of 3.0 D.

EXAMPLE 23

The lens kit of any of Examples 20-22, wherein said at least two progressive lenses comprise at least three progressive lenses.

EXAMPLE 24

The lens kit of any of Examples 20-22, wherein said at least two progressive lenses comprise at least four progressive lenses.

EXAMPLE 25

The lens kit of any of Examples 20-22, wherein said at least two progressive lenses comprise at least five progressive lenses.

EXAMPLE 26

The lens kit of any of Examples 20-22, wherein said at least two progressive lenses comprise at least six progressive lenses.

EXAMPLE 27

A lens kit comprising:
at least two lenses belonging to a single lens design, each of the at least two lens comprising:
a far vision zone;
a near vision zone configured to provide an add power; and
a corridor connecting the far vision zone and the near vision zone
wherein the at least two lenses provide different add powers, and
wherein the normalized width of the far vision zone changes with add power.

EXAMPLE 28

The lens kit of Example 27, wherein the normalized width of the far vision zone increases with add power.

EXAMPLE 29

The lens kit of any of Examples 27-28, wherein the normalized width of the near vision zone changes with add power.

EXAMPLE 30

The lens kit of Example 29, wherein a normalized power width of the near vision zone increases with add power, the normalized power width corresponding to a horizontal width of the near vision zone between add power isolines at 75% of the prescribed add power.

EXAMPLE 31

The lens kit of Example 30, wherein the normalized power width of the near zone of a lens in the lens kit configured to provide add power greater than 2.0 D is about 7%-20% larger than the normalized power width of the near zone of another lens in the lens kit configured to provide add power less than 2.0 D.

EXAMPLE 32

The lens kit of any of Examples 27-31, wherein a normalized width of the corridor decreases with add power.

EXAMPLE 33

The lens kit of any of Examples 27-32, wherein a lens in the lens kit configured to provide add power greater than 2.0 D has a normalized maximum cylinder power that is about 15%-35% larger than the normalized maximum cylinder power of another lens in the lens kit configured to provide add power less than 2.0 D.

EXAMPLE 34

The lens kit of any of Examples 27-33, wherein the maximum gradient of cylinder power divided by add power increases linearly with add power between 1.0 D and 3.0 D.

EXAMPLE 35

A lens kit comprising:
at least two lenses belonging to a single lens design, each of the at least two lens comprising:
a far vision zone;
a near vision zone configured to provide an add power; and
a corridor connecting the far vision zone and the near vision zone
wherein the at least two lenses provide different add powers, and
wherein a normalized power width of the near vision zone increases with add power, the normalized power width corresponding to a horizontal width of the near vision zone between add power isolines at 75% of the prescribed add power.

EXAMPLE 36

The lens kit of Example 35, wherein the normalized power width of the near zone of a lens in the lens kit configured to provide add power greater than 2.0 D is about 7%-20% larger than the normalized power width of the near zone of another lens in the lens kit configured to provide add power less than 2.0 D.

EXAMPLE 37

The lens kit of any of Examples 35-36, wherein a normalized width of the far vision zone increases with add power.

EXAMPLE 38

The lens kit of any of Examples 35-37, wherein a normalized width of the corridor decreases with add power.

EXAMPLE 39

The lens kit of any of Examples 35-38, wherein a lens in the lens kit configured to provide add power greater than 2.0 D has a normalized maximum cylinder power that is about 15%-35% larger than the normalized maximum cylinder power of another lens in the lens kit configured to provide add power less than 2.0 D.

EXAMPLE 40

The lens kit of any of Examples 35-39, wherein the maximum gradient of cylinder power divided by add power increases linearly with add power between 1.0 D and 3.0 D.

EXAMPLE 41

A method of producing a progressive ophthalmic lens having
a far vision zone, a near vision zone and a corridor connecting the near and far optical zones, said method comprising:
receiving a prescription including an optical add power for an individual; and
selecting a normalized width of the corridor corresponding to the minimum width of the corridor between cylinder isolines corresponding to 25% of the optical add power based on the optical add power.

EXAMPLE 42

The method of Example 41, wherein the normalized width of the corridor of a first lens having a first add power is greater than the normalized width of the corridor of a second lens having a second add power greater than the first add power.

EXAMPLE 43

The method of Example 42, wherein the first lens has an add power less than 2.0 D and a normalized corridor width between 6-8 degrees of field of view (FOV).

EXAMPLE 44

The method of any of Examples 42-43, wherein the first lens has an add power less than 2.0 D and a normalized corridor width between 3-4 mm.

EXAMPLE 45

The method of any of Examples 42-44, wherein the second lens has an add power greater than 2.0 D and a normalized corridor width between 5-6.5 degrees of field of view (FOV).

EXAMPLE 46

The method of any of Examples 42-45, wherein the second lens has an add power greater than 2.0 D and a normalized corridor width between 2.5 mm and 3.25 mm.

EXAMPLE 47

The method of any of Examples 41-46, wherein the normalized power width of the near zone increases with add power, the normalized power width of the near zone corresponding to a horizontal width of the near vision zone between add power isolines at 75% of the optical add power.

EXAMPLE 48

The method of any of Examples 41-47, wherein the normalized power width of the near zone of a lens configured to provide add power greater than 2.0 D is about 7%-20% larger than the normalized power width of the near zone of another lens configured to provide add power less than 2.0 D.

EXAMPLE 49

The method of any of Examples 41-48, wherein the normalized power width of the far zone increases with add power.

EXAMPLE 50

A method of producing a progressive ophthalmic lens having a far vision zone, a near vision zone and a corridor connecting the near and far optical zones, said method comprising:
receiving a prescription including an optical add power for an individual; and
selecting a normalized power width of the near zone based on the optical add power, the normalized power width of the near zone corresponding to a horizontal width of the near vision zone between add power isolines at 75% of the optical add power.

EXAMPLE 51

The method of Example 50, wherein the normalized power width of the near zone increases with add power.

EXAMPLE 52

The method of any of Examples 50-51, wherein the normalized power width of the near zone of a lens configured to provide add power greater than 2.0 D is about 7%-20% larger than the normalized power width of the near zone of another lens configured to provide add power less than 2.0 D.

EXAMPLE 53

The method of any of Examples 50-52, wherein the normalized power width of the far zone increases with add power.

EXAMPLE 54

The method of any of Examples 50-53, wherein a normalized width of the corridor of a first lens having a first add power is greater than a normalized width of the corridor of a second lens having a second add power greater than the first add power, wherein the normalized width of the corridor corresponds to the minimum width of the corridor between cylinder isolines corresponding to 25% of the optical add power.

EXAMPLE 55

The method of Example 54, wherein the first lens has an add power less than 2.0 D and a normalized corridor width between 6-8 degrees of field of view (FOV).

EXAMPLE 56

The method of Example 54, wherein the first lens has an add power less than 2.0 D and a normalized corridor width between 3-4 mm.

EXAMPLE 57

The method of Example 54, wherein the second lens has an add power greater than 2.0 D and a normalized corridor width between 5-6.5 degrees of field of view (FOV).

EXAMPLE 58

The method of Example 54, wherein the second lens has an add power greater than 2.0 D and a normalized corridor width between 2.5 mm and 3.25 mm.

EXAMPLE 59

The method of any of Examples 1-8, and 41-58, wherein said method is configured to produce any of said at least two lenses of any of Examples 9-40 above.

EXAMPLE 60

A non-transitory storage medium comprising instructions which when executed by an electronic processor is configured to perform a method of producing a progressive ophthalmic lens having a far vision zone, a near vision zone and a corridor connecting the near and far optical zones, said method comprising: receiving a prescription including an optical add power for an individual; and selecting at least one optical design parameter of a surface of the progressive ophthalmic lens based on add power,
wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 61

The non-transitory statutory medium of Example 60, wherein said method of producing a progressive ophthalmic lens further comprises any of the method step of any of Examples 1-8 and 41-59.

EXAMPLE 62

A method of producing a progressive ophthalmic lens having a far vision zone, a near vision zone and a corridor connecting the near and far optical zones, said method comprising:
receiving a prescription for an individual;
receiving an age of the individual; and
selecting at least one optical design parameter of a surface of the progressive ophthalmic lens based on the received age,
wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 63

The method of Example 62, wherein the method further comprises fabricating the progressive ophthalmic lens having the selected at least one optical design parameter.

EXAMPLE 64

The method of any of Examples 62-63, wherein a progressive ophthalmic lens configured to provide optical add power less than 2.0 D has a normalized corridor width that is greater than a normalized corridor width of another progressive ophthalmic lens configured to provide optical add power greater than 2.0 D, wherein the normalized corridor width corresponds to the minimum width of the corridor between cylinder isolines corresponding to 25% of the optical add power.

EXAMPLE 65

The method of any of Examples 62-64, further comprising determining a prescribed optical add power associated with the age of the individual.

EXAMPLE 66

The method of Example 65, wherein a progressive ophthalmic lens configured to provide optical add power greater than 2.0 D has a normalized near zone power width that is about 7%-20% larger than the near zone width of another progressive ophthalmic lens configured to provide optical add power less than 2.0 D, wherein the normalized near zone power width corresponds to a horizontal width of the near zone between add power isolines at 75% of the prescribed add power.

EXAMPLE 67

The method of any of Examples 62-63 and 65-66, wherein a progressive ophthalmic lens configured to provide optical add power greater than 2.0 D has a normalized maximum cylinder power that is about 15%-35% larger than the normalized maximum cylinder power of another progressive ophthalmic lens configured to provide optical add power less than 2.0 D.

EXAMPLE 68

The method of any of Examples 62-67, wherein the at least one optical design parameter comprises a normalized width of the corridor.

EXAMPLE 69

The method of any of Examples 62-68, wherein the at least one optical design parameter comprises a normalized power width of the near vision zone.

EXAMPLE 70

The method of any of Examples 62-69, wherein the maximum cylinder power gradient per add power increases linearly with add power between 1.0 D and 3.0 D.

EXAMPLE 71

A method of producing a progressive ophthalmic lens having a far vision zone, a near vision zone and a corridor connecting the near and far optical zones, said method comprising:
receiving a prescription for an individual;
receiving an age of the individual;
determining an optical add power associated with the age of the individual; and
selecting a normalized width of the corridor corresponding to the minimum width of the corridor between cylinder isolines corresponding to 25% of the optical add power based on the optical add power.

EXAMPLE 72

The method of Example 71, wherein the normalized width of the corridor of a first lens having a first add power is greater than the normalized width of the corridor of a second lens having a second add power greater than the first add power.

EXAMPLE 73

The method of Example 72, wherein the first lens has an add power less than 2.0 D and a normalized corridor width between 6-8 degrees of field of view (FOV).

EXAMPLE 74

The method of any of Examples 72-73, wherein the first lens has an add power less than 2.0 D and a normalized corridor width between 3-4 mm.

EXAMPLE 75

The method of any of Examples 72-74, wherein the second lens has an add power greater than 2.0 D and a normalized corridor width between 5-6.5 degrees of field of view (FOV).

EXAMPLE 76

The method of any of Examples 72-75, wherein the second lens has an add power greater than 2.0 D and a normalized corridor width between 2.5 mm and 3.25 mm.

EXAMPLE 77

The method of any of Examples 71-76, wherein the normalized power width of the near zone increases with add power, the normalized power width of the near zone corresponding to a horizontal width of the near vision zone between add power isolines at 75% of the optical add power.

EXAMPLE 78

The method of Example 77, wherein the normalized power width of the near zone of a lens configured to provide add power greater than 2.0 D is about 7%-20% larger than the normalized power width of the near zone of another lens configured to provide add power less than 2.0 D.

EXAMPLE 79

The method of any of Examples 71-78, wherein the normalized power width of the far zone increases with add power.

EXAMPLE 80

A method of producing a progressive ophthalmic lens having a far vision zone, a near vision zone and a corridor connecting the near and far optical zones, said method comprising:
receiving a prescription for an individual;
receiving an age of the individual;
determining an optical add power associated with the age of the individual; and
selecting a normalized power width of the near zone based on the optical add power, the normalized power width of the near zone corresponding to a horizontal width of the near vision zone between add power isolines at 75% of the optical add power.

EXAMPLE 81

The method of Example 80, wherein the normalized power width of the near zone increases with add power.

EXAMPLE 82

The method of any of Examples 80-81, wherein the normalized power width of the near zone of a lens configured to provide add power greater than 2.0 D is about 7%-20% larger than the normalized power width of the near zone of another lens configured to provide add power less than 2.0 D.

EXAMPLE 83

The method of Example 82, wherein the normalized power width of the far zone increases with add power.

EXAMPLE 84

The method of any of Examples 80-83, wherein a normalized width of the corridor of a first lens having a first add power is greater than a normalized width of the corridor of a second lens having a second add power greater than the first add power, wherein the normalized width of the corridor corresponds to the minimum width of the corridor between cylinder isolines corresponding to 25% of the optical add power.

EXAMPLE 85

The method of Example 84, wherein the first lens has an add power less than 2.0 D and a normalized corridor width between 6-8 degrees of field of view (FOV).

EXAMPLE 86

The method of any of Examples 84-85, wherein the first lens has an add power less than 2.0 D and a normalized corridor width between 3-4 mm.

EXAMPLE 87

The method of any of Examples 84-86, wherein the second lens has an add power greater than 2.0 D and a normalized corridor width between 5-6.5 degrees of field of view (FOV).

EXAMPLE 88

The method of any of Examples 84-87, wherein the second lens has an add power greater than 2.0 D and a normalized corridor width between 2.5 mm and 3.25 mm.

EXAMPLE 89

The method of any of Examples 62-88, wherein said method is configured to produce any of said at least two lenses of any of Examples 9-40 above.

EXAMPLE 90

A non-transitory storage medium comprising instructions which when executed by an electronic processor is configured to perform a method of producing a progressive ophthalmic lens having a far vision zone, a near vision zone and a corridor connecting the near and far optical zones, said method comprising: receiving a prescription for an individual;
receiving an age of the individual; and
selecting at least one optical design parameter of a surface of the progressive ophthalmic lens based on the age,
wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 91

The non-transitory statutory medium of Example 90, wherein said method of producing a progressive ophthalmic lens further comprises any of the method step of any of Examples 62-88.

EXAMPLE 92

A method of producing a progressive ophthalmic lens having a far vision zone, a near vision zone and a corridor connecting the near and far optical zones, said method comprising:
receiving (i) a prescription including an optical add power for an individual, or (ii) a prescription for an individual and an age of the individual; and
selecting at least one optical design parameter of a surface of the progressive ophthalmic lens based on the (a) optical add power or (b) the age of the individual,
wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 93

The method of Example 92, further comprising:
receiving a prescription for an individual and an age of the individual; and
determining a prescribed optical add power associated with the age of the individual.

EXAMPLE 94

The method of any of Examples 92-93, wherein the method further comprises fabricating the progressive ophthalmic lens having the selected at least one optical design parameter.

EXAMPLE 95

The method of any of Examples 92-94, wherein a progressive ophthalmic lens configured to provide optical add power less than 2.0 D has a normalized corridor width that is greater than a normalized corridor width of another progressive ophthalmic lens configured to provide optical add power greater than 2.0 D, wherein the normalized corridor width corresponds to the minimum width of the corridor between cylinder isolines corresponding to 25% of the optical add power.

EXAMPLE 96

The method of any of Examples 92-94, wherein a progressive ophthalmic lens configured to provide optical add power greater than 2.0 D has a normalized near zone power width that is about 7%-20% larger than the near zone width of another progressive ophthalmic lens configured to provide optical add power less than 2.0 D, wherein the normalized near zone power width corresponds to a horizontal width of the near zone between add power isolines at 75% of the prescribed add power.

EXAMPLE 97

The method of any of Examples 92-94 and 96, wherein a progressive ophthalmic lens configured to provide optical add power greater than 2.0 D has a normalized maximum cylinder power that is about 15%-35% larger than the normalized maximum cylinder power of another progressive ophthalmic lens configured to provide optical add power less than 2.0 D.

EXAMPLE 98

The method of any of Examples 92-97, wherein the at least one optical design parameter comprises a normalized width of the corridor.

EXAMPLE 99

The method of any of Examples 92-97, wherein the at least one optical design parameter comprises a normalized power width of the near vision zone.

EXAMPLE 100

The method of any of Examples 92-97, wherein the maximum cylinder power gradient per add power increases linearly with add power between 1.0 D and 3.0 D.

EXAMPLE 101

A non-transitory storage medium comprising instructions which when executed by an electronic processor is configured to perform a method of producing a progressive ophthalmic lens having a far vision zone, a near vision zone and a corridor connecting the near and far optical zones, said method comprising:

receiving (i) a prescription including an optical add power for an individual, or (ii) a prescription for an individual and an age of the individual; and selecting at least one optical design parameter of a surface of the progressive ophthalmic lens based on the (a) optical add power or (b) the age of the individual, wherein the at least one optical design parameter comprises at least one of a normalized width of the far vision zone, a normalized width of the near vision zone, a normalized width of the corridor, a normalized maximum cylinder power per add power in the near vision zone, or a maximum gradient of residual cylinder power per add power in the near vision zone.

EXAMPLE 102

The non-transitory statutory medium of Example 101, wherein said method of producing a progressive ophthalmic lens further comprises any of the method step of any of Examples 92-100.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts.

FIGS. 3A-1 to 3A-3 and FIGS. 3B-1 to 3B-3 are residual cylinder plots for three different add powers of lenses based on the innovative lens design (new) and another different lens design (old). FIGS. 3A-1-3A-3 show the variation in the width of the far vision zone for different example ophthalmic lenses providing different add powers based on the innovative lens design described herein. FIGS. 3B-1-3B-3 show the variation in the width of the far vision zone for different example ophthalmic lenses providing different add powers based on another different lens design described herein.

FIGS. 4A-1 to 4A-3 and FIGS. 4B-1 to 4B-3 are residual cylinder plots for three different add powers of lenses based on the innovative lens design (new) and another different lens design (old). FIGS. 4A-1-4A-3 show the variation in the maximum residual cylinder power across the surface of different embodiments of ophthalmic lenses providing different add powers based on the innovative lens design. FIGS. 4B-1-4B-3 show the variation in the maximum residual cylinder power across the surface of different embodiments of ophthalmic lenses providing different add powers based on another different lens design.

FIGS. 5A-1-5A-3 is a plot of the gradient of the residual cylinder power that shows the variation in the gradient of residual cylinder power across the surface of different example ophthalmic lenses providing different add powers based on the innovative lens design described herein. FIGS. 5B-1-5B-3 is a plot of the gradient of the residual cylinder power that shows the variation in the gradient of residual cylinder power across the surface of different example ophthalmic lenses providing different add powers based on another different lens design.

FIGS. 6A-1-6A-3 is a plot of the add power that shows the variation in the add power and power width of the near vision zone in different example ophthalmic lenses providing different add powers based on the innovative lens design described herein. FIGS. 6B-1-6B-3 is a plot of the add power that shows the variation in the add power and power width of the near vision zone for different example ophthalmic lenses providing different add powers based on another different lens design.

DETAILED DESCRIPTION OF THE PREFERRED EMBODIMENT

Figure 1A:
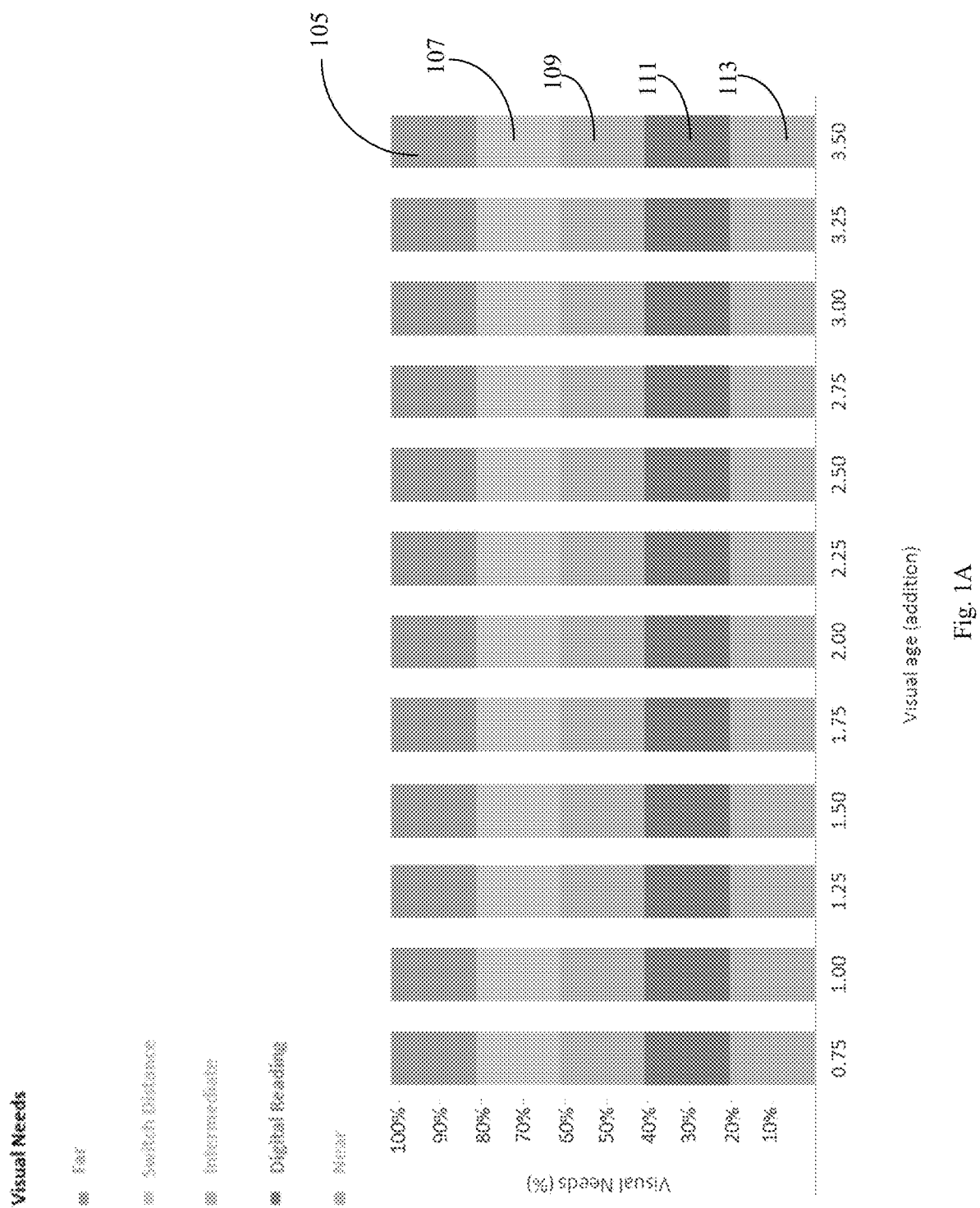
FIGS. 1A and 1B show the visual needs of individuals having different add powers in a sample of the general population.

It is to be understood that the figures and descriptions of the present invention have been simplified to illustrate elements that are relevant for a clear understanding of the present invention, while eliminating, for the purpose of clarity, many other elements found in typical lenses, eyewear, lens design and/or manufacturing methods. Those of ordinary skill in the arts can recognize that other elements and/or steps are desirable and may be used in implementing the embodiments described herein.

The term "individual" as used herein may refer to persons such as eye glass wearers and/or patients. These individuals may have prescriptions which can be satisfied by lenses such as progressive lenses to provide refractive correction.

The term "residual cylinder power" or "residual cylinder" is used herein consistently as understood by those skilled in the art to indicate the cylinder power obtained by subtracting any prescribed cylinder power from the total cylinder power. Such calculations are known by one skilled in the art. In various embodiments, described herein the residual cylinder power can be determined using a ray tracing method accounting for the position of the lens with respect to the eye. Without any loss of generality, the ray tracing method generates a wavefront based on one or more objects. The residual cylinder power of the lens is determined from the aberrations in the generated wavefront as it is propagated through the lens to the eye. In this ray tracing method the position of the lens with respect to the eye and/or the orientation (e.g., tilt) of the lens with respect to the eye is included in the calculation. In some implementations, the position of the lens with respect to the eye can be expressed using the Back Vertex Distance (BVD). BVD can correspond to the distance between the iris of the eye, e.g., the iris vertex or the cornea, e.g., vertex or apex of the cornea and the back surface of the lens. In some such implementations, BVD can have a default value of 13 mm. In some implementations, BVD can correspond to the distance between the center of rotation of the eye and the fitting point on the back surface of the lens. In some such implementations, BVD can have a default value of 27 mm. The orientation of the lens can be expressed with the panoramic and pantoscopic tilt of the lens as it is positioned in front of the eye. In some such implementations, panoramic tilt can have a default value of about 5 degrees by default and pantoscopic tilt can have a default value of about 4 degrees.

This is in contrast to determining the residual cylinder based on geometric characteristics of the lens surfaces, calculating the local maximum and minimum radii of curvature at a point in a region on a surface of the lens without taking into account the position of the lens with respect to the eye and/or the orientation (e.g., tilt) of the lens with respect to the eye.

The term "far vision correction" or "distance vision correction" as used herein indicates the refraction correction the eye of an individual requires from a vision correcting lens when viewing objects at a distance greater than about 20 feet while the individual uses no accommodation. The term "near vision correction" as used herein indicates the refraction correction the eye of an individual requires from a vision correction lens when viewing objects at a distance of about 16 inches, taking into account the individual's accommodation ability. The term "medium vision correction" or "intermediate distance vision correction" as used herein indicates the refraction correction the eye of an individual requires from a vision correcting lens when viewing objects at a distance greater than 16 inches and less than or equal to about 20 feet without requiring the individual to use accommodation. The term "far optical zone" or "far zone" as used herein refers to the optical zone or area that is configured to provide distance vision correction. The term "near optical zone" or "near zone" as used herein refers to the optical zone or area that is configured to provide near vision correction.

The far zone has a fitting point (FP), a normalized far cylinder width and a normalized far power width. The normalized far cylinder width corresponds to a horizontal width through the fitting point between cylinder isolines of 0.25 D. The normalized far power width corresponds to a horizontal width through the fitting point between power isolines having a value equal to the minimum power at the fitting point plus 0.25 D.

The near zone has a near measuring point (NMP) where the optical add power is equal to the prescribed add power. The near zone has a normalized near cylinder width and a normalized near power width. In some implementations, the normalized near cylinder width corresponds to a horizontal width through the NMP between cylinder isolines that are 75% of the prescribed add power. In some other implementations, the normalized near cylinder width can correspond to a horizontal width through the NMP between cylinder isolines that are 25% or 50% of the prescribed add power. In some implementations, the normalized near power width corresponds to a horizontal width through the NMP between power isolines that are 75% of the prescribed add power. In some other implementations, the normalized near power width can correspond to a horizontal width through the NMP between power isolines that are 25% or 50% of the prescribed add power. Without any loss of generality, in various implementations, the horizontal width of the near zone is measured at the vertical level of the NMP.

A corridor extending from the fitting point to the NMP connects the far zone and the near zone. The corridor can have a length and a normalized width. In some implementations, the normalized width of the corridor corresponds to the minimum width in the corridor between cylinder isolines that are 25% of the prescribed add power. In some other implementations, the normalized width of the corridor corresponds to the minimum width in the corridor between cylinder isolines that are 50% or 75% of the prescribed add power. Without any loss of generality, the normalized width of the corridor corresponding to the minimum width in the corridor between cylinder isolines that are 25% of the prescribed add power can be lesser than the normalized width of the corridor corresponding to the minimum width in the corridor between cylinder isolines that are 50% or 75% of the prescribed add power.

The location of the NMP on the surface of the lens can depend on the spherical power of the lens and the length of the corridor. For example, the location of the NMP of a lens having a fitting height of about 18 mm can be about 15-16 mm below the fitting point of the lens. As another example, the location of the NMP of a lens having a fitting height of about 14 mm can be about 12 mm below the fitting point. Without any loss of generality, the vertical distance between the fitting point and the lower edge of the lens/lower rim frame can be referred to as the fitting height.

The widths of various regions of the lens (e.g., normalized cylinder and/or power width of the far zone, normalized cylinder and/or power width of the near zone, normalized width of the corridor) can be measured in terms of field of view in degrees or mm. On an average, a width corresponding to 1 degree of field of view can be approximately equal to about 0.5 mm. In some implementations, back vertex distance (BVD) can be used to calculate the width in mm from width corresponding to degrees of field of view. Using BVD the mean gaze angle of the eye when it is looking at an object can be converted to a width in mm. In some implementations, BVD can correspond to the distance between the iris of the eye, e.g., the iris vertex or the cornea, e.g., vertex or apex of the cornea and the back surface of the lens. In some such implementations, BVD can have a default value of 13 mm. In some implementations, BVD can correspond to the distance between the center of rotation of the eye and the fitting point on the back surface of the lens. In some such implementations, BVD can have a default value of 27 mm.

As used herein optical power is measured in Diopter and can be expressed with units of "Diopter" or "D". As used herein the terms "add power" "addition" and "addition power" can be used interchangeably.

In one approach to dispensing a progressive lens configured to provide a certain add power for an individual, the individual may be provided with a questionnaire that seeks answers related to the individual's lifestyle and visual requirements. The prescription providing the amount of spherical power, addition power, cylinder power, etc. required to correct visual defects in the individual and the responses of the individual to the questionnaire may be sent to a laboratory that fabricates the lens. The lens design can be selected based on the prescription and the individual's responses. The lens design may for example have a particular relative sizes and shapes of near and far zones and corridors and distribution of residual power. Based on the lens design, the laboratory generates a lens surface using a "lens code" that defines a surface shape. The lens code can correspond to the map of the surface of the ophthalmic lens that provides a suitable vision correction. The map of the surface of the ophthalmic lens can depict, for example, the variation in the shape (e.g., curvatures) and/or optical powers across the surface of the lens. The lens code, although based on a particular lens design, can vary somewhat based on the individual's prescription. Nevertheless, lenses in a given product line which are based on the same or a single lens design have similarities in features such as relative sizes and shapes of near and far zones and corridors and distribution of residual power, despite being different for different individual prescriptions. Accordingly, for a given product line or lens design, ophthalmic lenses with different lens codes configured to provide different add power share similarities in various design features. For example, various surface characteristics, such as the power or cylinder width of a far zone, the power or cylinder width of a near zone, the width of a corridor, the maximum residual cylinder, the maximum gradient of residual cylinder of ophthalmic lenses (as reflected by the respective lens codes) for a given lens design can be same or substantially same when normalized to add power. Normalized to add power includes dividing a surface characteristic or parameter (e.g., the maximum residual cylinder, the maximum gradient of residual cylinder) by the add power or measuring a surface characteristic or parameter (e.g., the power or cylinder width of a near vision zone, the width of a corridor) between isolines, for example, that are a percentage (e.g., 25%, 50%, 75%) of the add power. Accordingly, for a given lens design or product line, the corridor widths normalized to add power of a first ophthalmic lens configured to provide a first add power can be equal or substantially equal and a second ophthalmic lens configured to provide a second add power. As used herein, a first value can be considered to be substantially same as or substantially equal to a second value when the difference between the first value and the second value is less than or equal to 2%. Thus, a first value can be considered to be substantially same as or substantially equal to a second value when the first value is in a range between the second value ±2% of the second value. As another example, if the lens design is a short corridor design with a wide near zone, then the corridor length and the near zone width normalized to the add power can be substantially the same over a range of add powers.

A given lens design may represent the designers choices as to how to provide suitable correction in a progressive lens and may in addition take into account the individual's comfort, ease of use, performance of optical correction, and other considerations such as how the lens is used by the individual. Some approaches to designing progressive lenses, for example, try to achieve a balanced lens by giving substantially equal importance to an individual's far vision requirements, near vision requirements and intermediate vision requirements independent of the individual's add power. For example, the visual performance of an ophthalmic lens designed using some of these approaches work well for individuals having different add power requirements that spend the same amount of time engaging in (i) activities that require far vision (e.g., driving) corresponding to region 105; (ii) activities that require intermediate vision (e.g., viewing a desktop computer screen) corresponding to region 107; (iii) activities that require intermediate vision for digital reading (e.g., viewing a smartphone, or a tablet) corresponding to region 111; (iii) activities that require near vision (e.g., reading) corresponding to region 113; and (iv) activities that require switching between two vision zones corresponding to region 107 as shown in FIG. 1A.

Figure 1B:
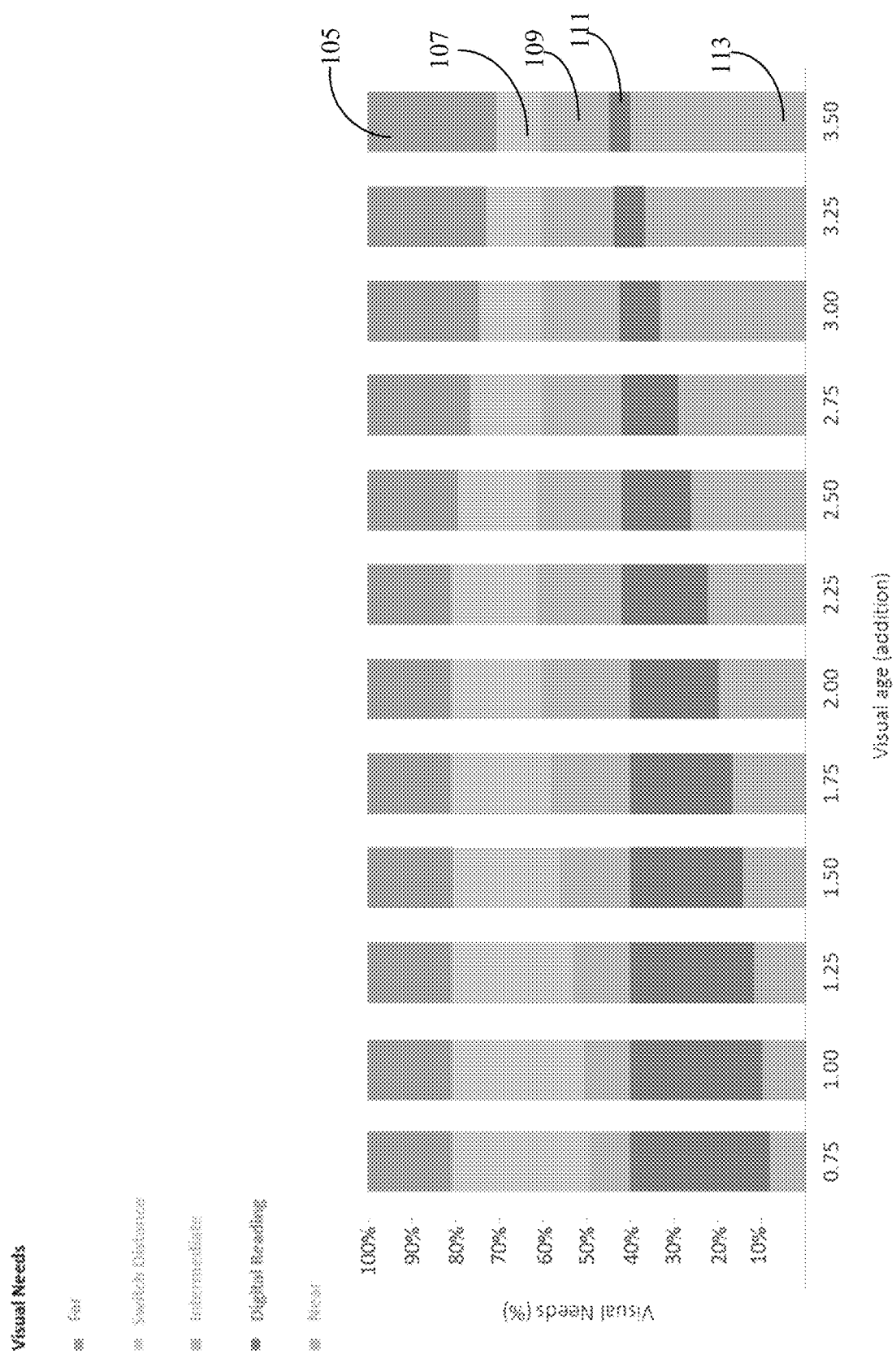

Such methods of designing progressive lenses may not take into account that individuals having different add powers may spend different amounts of time engaging in activities that require far vision, intermediate vision, near vision and/or switching between two vision zones. Additionally, or alternatively, such methods of designing progressive lenses may not take into account that individuals having different add power may attribute a higher importance to one or more of these activities. Recent studies indicate that the visual needs of an individual may vary with add power as shown in FIG. 1B. For example, an individual with an add power of 0.75 D may spend more time looking at a handheld device, for example a smart phone or tablet, which involves more intermediate vision and switching between different vision zones than engaging in activities that involve near vision or far vision. As another example, an individual with an add power of 3.5 D may spend more time engaging in activities that involve near vision or far vision than engaging in activities that involve intermediate vision such as, for example, looking at a smart phone or tablet, or switching between different vision zones. Some progressive lens designs may not be able to adequately satisfy the different visual requirements of different individuals having different add powers due to a "one size fits all" approach. Thus, a lens design that considers the visual needs of the individual based on their add power would be advantageous. Without any loss of generality, the innovative method of designing progressive lenses discussed herein may consider the visual needs of the individual based on a variety of factors such as amount of time spent engaging in different activities that utilize different visual zones, subjective importance from the individual or other considerations.

Furthermore, as the individual's add power requirement increases with age over time, an ophthalmic lens from a different lens design (e.g. different product line, different lens designer, lens design provider, etc.) may be more suitable to meet the individual's needs than an ophthalmic lens having a same design (e.g., same product line) but higher add power than the ophthalmic lens currently used by the individual. Although, the ophthalmic lens from the different lens design may be more suitable to meet the individual's needs, there may be significant differences between the design features of the lens currently being worn by the individual and the new lens design. The individual may not be able to adapt easily to the new lens design due to the significant differences and/or may experience discomfort. For example, as a result of a change in the add power of the individual patient, the patient may be prescribed a lens with a shorter corridor length than the corridor length of the lens currently being worn by the patient. A shorter corridor length may, for example, have a higher gradient of residual cylinder power, which may cause discomfort for the patient. Thus, a lens design that evolves to meet the patient's visual requirements at different add powers (e.g., as the patient ages) while making it easy for the patient to adjust to the new lens prescribed for a different add power may be advantageous.

Having a single lens design configured to provide different ophthalmic lenses that more effectively satisfy the patient's visual requirement at different add powers can also simplify dispensing for the eye care professional (ECP). The innovative lens design discussed herein and the lenses based on the innovative lens design takes changes in the patient's visual requirements into consideration as his/her add power changes as he/she ages. Thus, the innovative lens design can advantageously provide the surface characteristics of an ophthalmic lens that a patient will likely need as he/she ages. Accordingly, the innovative lens design may be configured to provide a series of lenses with progressively increasing add power (e.g., 0.5 D, 0.75 D, 1.0 D, 1.25 D, 1.5 D, 1.75 D, 2.0 D, 2.25 D, 2.5 D, 2.75 D, 3.0 D, 3.25 D, 3.5 D, 3.75 D, etc.) that meet the visual requirements over a wide range of different add powers. The surface characteristics (e.g., width of the far vision zone, width of the near vision zone, width of the corridor, the maximum residual cylinder, the maximum gradient of residual cylinder, etc.) of an optical lens in the series of optical lenses may be gradually changed so as to meet the changing needs of the patient and potentially ease the transition of the patient into a lens having design features that may be suitable for their add power and their needs but otherwise difficult to adapt to. For example, the surface characteristics of the ophthalmic lenses provided by the innovative lens design at lower add powers may have longer corridors and/or smaller gradients of residual cylinder power to allow the patient to adapt to the progressive lens. The surface characteristics of subsequent lenses having increasing add powers may gradually reduce the corridor length and/or increase the gradients of residual cylinder to meet the visual requirements at higher add powers while also allowing the patient to adapt to the new design features. The innovative lens design described in this application can provide different solutions for patients with different add powers using a single design (or product line). This design is to be contrasted with other lens designs.

Figure 2:
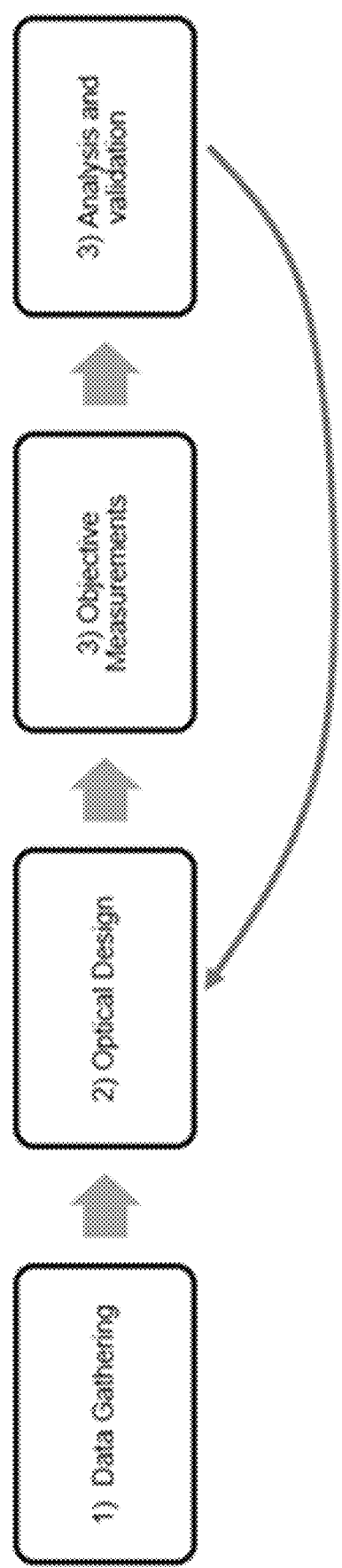
FIG. 2 is a flow chart that illustrates an example method of designing an ophthalmic lens/creating a lens design based on an individual's required add power.

FIG. 2 is a flowchart of an example method of creating a progressive lens design that meets the visual requirements of the patient for a desired add power. Other methods of designing a progressive lens, however, are also possible. This example method comprises gathering data regarding the activities that patients with different optical add powers engage in and the amount of time spent being engaged in these activities. In one method of data gathering, a large sample of individuals having different add power requirements representing the general population were surveyed to gather information regarding the "visual needs" of these individuals. In particular, the "visual needs" of these individuals was explored by requesting the individuals to provide information as to how much the individual partook in various types of activities. The visual needs were mapped to five different categories: (i) activities requiring far vision, such as, for example, outdoor activities including driving, walking, playing sports, etc.; (ii) activities requiring switching focus from one distance to another such as switching between driving and looking at a smartphone or tablet; (iii) activities requiring intermediate vision, such as, for example, working in an office setting work in front of a desktop computer; (iv) activities requiring intermediate-near vision used for digital reading using handheld digital devices such as smartphones and tablets; and (v) activities requiring near vision used mainly during writing or reading a book, newspaper, etc. Information compiled related to the amount of time the individuals with different add powers spent on the different activities, such as, for example, driving, using a computer during the course of the day, engaging in outdoor activities such as playing sports, using smartphone or tablets. Regarding smartphone and tablet use, information regarding the purpose (e.g., whether for phone calls or other uses such as reading, surfing the Internet, games, and so on) for which these devices were used was obtained along with frequency of use of smartphone (e.g., what percentage of time per hour was spent looking at their phone). With regard to use of Internet, information was collected as to whether the Internet was used for online shopping, reading, and so on.

Each activity/category was rated by importance based on the relative time spent on each visual task. The results were analyzed and divided into subsets of the large sample population according to similarity of visual needs, as illustrated in FIG. 1B. One conclusion of the survey was that visual needs generally correlate statistically with age. Moreover, visual needs correlate with the add power of the individual. For example, data demonstrated that younger presbyopes requiring a lower add power (e.g., add power between 0.75 D and 1.5 D) spent most of their time engaged in activities that involve intermediate-near vision used for digital reading using handheld digital devices such as smartphones and tablets or switching between two different vision zones. Activities involving near vision had lower priority as reading is mainly done on handheld digital devices. Accordingly, such younger presbyopes requiring a lower add power (e.g., add power between 0.75 D and 1.5 D) would likely benefit from a lens design configured for digital reading and for dynamic vision. By contrast, middle age presbyopes requiring an add power between 1.5 D and 2.75 D demonstrate more balanced needs. All vision zones appear to hold more or less equal importance for the middle age presbyopes. Data demonstrates that far vision and near vision are more important to mature presbyopes requiring a higher add power (e.g., add power between 2.75 D and 3.5 D) than digital reading or switching between different visions zones. Accordingly, mature presbyopes may benefit from a lens design configured for far and near vision, while switching between different vision zones, intermediate vision and digital reading have lower priority.

Since the addition parameter in the prescription generally correlates with age, for example, in general increasing with age, the add power may be associated with a representative of an age and the particular set of needs associated therewith. Accordingly, in various innovative designs presented herein, different add powers represent or correspond to different visual needs, and the surface characteristics of the ophthalmic lens is tailored to provide an optical solution that meet those visual needs.

It should be noted that visual needs of the sample population can vary with geographical location, local culture, habits, age, etc. Sociological changes and technological developments can impact human visual behavior, and the different age groups may response differently to these changes/developments. For example, younger populations may adopt new technologies more quickly. Thus, mature/ middle age presbyopes in 5-20 years from now may have different visual needs than mature/middle age presbyopes today. Therefore, the visual needs of the population should be periodically or continually monitored to keep providing solutions that meet the visual needs of those populations.

Once the data is gathered and categorized as discussed above, optical design parameters or surface characteristics for ophthalmic lenses for different add powers that meet the visual needs of individuals having that add power can be determined. For example, the surface characteristics for ophthalmic lenses for younger presbyopes having lower add power requirements can provide increased visual quality for digital reading and activities requiring switching between different visual zones. By comparison, surface characteristics for ophthalmic lenses for mature presbyopes can provide increased visual quality for activities requiring far and near vision. As yet another example, surface characteristics for ophthalmic lenses for middle age presbyopes can be balanced for far vision, near vision, intermediate distance vision, digital reading and switching between different vision zones.

Table 1 below shows the various optical design parameters that can be enhanced to meet different visual needs, and associated trade-offs. These trade-offs may reduce visual quality for some functions that are less important for the patient. However, the patient's visual needs for the less important functions may still be satisfied despite the trade-offs. Additionally, the trade-offs can have the least amount of clinical impact on the patient's vision. This is explained in greater detail with reference to Table 1 below.

TABLE 1

Optical design parameters that can be enhanced to meet different visual needs

| Need | Optical Design Parameters | Trade-Off |
| --- | --- | --- |
| Frequent Digital Use | Wide Corridor | Slightly narrower far zone |
| High Switch Frequency | Short Corridor, Low Residual Cylinder Gradients | Narrower near/far zones |
| Highly Dynamic Use | Low residual cylinder/power gradient (overall) | Narrower near/far zones |
| Frequent reading use | Wide near zone | Higher cylinder gradients |

Referring to Table 1, surface characteristics of ophthalmic lenses for younger presbyopes with low add power requirements can have a wide corridor and low power gradient and low residual cylinder in the lens and/or residual cylinder gradients. Such a design is more suitable for frequent digital use compared to others. Widening of the corridor, however, can narrow the width of the far and/or near zones. However, since younger presbyopes may not spend as much time engaged in activities requiring far and near vision zones by comparison to digital use, and since the residual cylinder is low, the reduction in the width of the far and/or near vision zones may be tolerable in many instances.

Referring to Table 1, surface characteristics for ophthalmic lenses for mature presbyopes with high add power requirements can have a wide near zone, which is more suitable to meet their visual need of reading. The width of the near zone for this population can be increased, which can increase gradients in the residual cylinder power. However, higher gradients in the residual cylinder power may be less uncomfortable for mature presbyopes compared for example to a young presbyope as the mature presbyopes may be more adapted to progressive lenses than a young presbyope who has spent less time wearing progressive lenses.

The adjustments in optical design parameters to meet the visual needs of individuals with different add powers may be tested using a head and eye tracking system. Such systems may enable objective observations as to how each population uses the lenses and facilitate determinations as to whether the lens use is improved over the baseline. A clinical verification of lenses having optical design parameters that meet the visual needs of individuals with different add powers may be performed by comparing to a base lens from another lens design that is not specifically configured to meet the visual needs of people with different add powers. The optical design parameters can be iteratively improved until the visual needs of individuals with different add powers is met. These optical design parameters can be used as prototypes for the new optical design to fabricate lenses.

An additional analysis may be performed in order to determine how much to limit the change in the optical design parameters for lenses having different add powers. For example, if a patient is currently wearing a first lens having a first optical power and is prescribed a second lens with higher addition and the optical design parameters change drastically, the patient may experience discomfort in wearing the second lens. Accordingly, as the individual patient's add power increases, the optical design parameters may gradually transition from one lens having a first add to a second lens having a second slightly higher add (e.g., 0.25 or 0.5 D) to meet the visual needs for that add power yet reducing patient's discomfort while adapting to the new lenses.

In some implementations, the optical design parameters for different add powers can be stored in a database and/or created by executing a set of instructions using an electronic processor or other electronics. An individual having a certain prescription including add power can be provided with a pair of ophthalmic lenses having optical design parameters that are generated to meet the visual needs of people having that add power. In some implementations, the prescription for the individual need not include an optical add power. In some implementations, a value based on or associated with the add may be used and the one or more design parameters may be determined based on this value. A look up table or database may, for example, be used to determine the optical design parameters from the value. In some implementations, the optical add power can be obtained from on an age of the individual or an age can be received and the optical design parameters can be associated with and/or based on the age. In some implementations, a value based on or associated with the age of the individual may be used and the one or more design parameters may be determined based on this value. A look up table or database, may for example, be used to determine the optical design parameters from the value. The age of the individual can be the chronological age of the individual or a physiological age of the individual, which, for example, can be estimated from the visual requirements of the individual, health, or other factors. Accordingly, an individual having a certain prescription can be provided with a pair of ophthalmic lenses having optical design parameters that are based on the prescribed optical add power, an optical add power associated with an age of the individual and/or a value associated with an optical add power for the individual. Similarly, an individual having a certain prescription can be provided with a pair of ophthalmic lenses having optical design parameters that are based on the age of the individual, an age associated with the individual and/or a value associated with an age of the individual. Additionally, in various implementations, fabricating and dispensing the ophthalmic lens is based on the prescription of the patient including the add power of the patient (or possibly the age of the person) without requiring any information about the patient's lifestyle or needs. This feature is different from other lens designs that involve soliciting responses from the patient related to their visual needs.

The difference between example lenses having optical design parameters obtained using the innovative lens design described herein and lenses having optical design parameters using another lens design is discussed below.

In particular, FIGS. 3A-1 to 3A-3 show the variation of the corridor width and the width of the far vision zone for lenses having optical design parameters obtained using the innovative lens design described herein. FIGS. 3B-1 to 3B-3 show the variation of the corridor width and the width of the far vision zone for lenses having optical design parameters obtained using another different lens design. As discussed above, in accordance with the innovative lens design described herein, the optical design of lenses to be provided for younger presbyopes having low add power requirements has a wider corridor to satisfy their increased visual need for digital reading. The width of the far vision zone may, however, be reduced. By comparison, in accordance with the innovative lens design described herein, the optical design of lenses to be provided for mature presbyopes having high add power requirements can have a narrower corridor and correspondingly a wider far vision zone as shown in FIGS. 3A-1 to 3A-3. In contrast, the corridor width can be the same or substantially the same (e.g., variation of less than 1 or 2 degrees of FOV or variation of less than 0.5 mm or 1 mm) for different add powers in lenses based on the other lens design shown in FIGS. 3B-1 to 3B-3. The various isolines depicted in FIGS. 3A-1 to 3A-3 and 3B-1 to 3B-3 correspond to different residual cylinder powers. The innermost isoline corresponds to a residual cylinder power of 0.25 D. The residual cylinder power of the different isolines progressively increases from 0.25 D in increments of 0.25 D. The values on the horizontal axis in FIGS. 3A-1 to 3B-3 vary from −40 degrees to 60 degrees in increments of 10 degrees. The values on the vertical axis in FIGS. 3A-1 to 3B-3 vary from −40 degrees to 40 degrees in increments of 10 degrees.

FIGS. 4A-1-4A-3 show the variation in the maximum residual cylinder power across the surface of different ophthalmic lenses providing different add powers based on the innovative lens design. FIGS. 4B-1-4B-3 show the variation in the maximum residual cylinder power across the surface of different ophthalmic lenses providing different add powers based on another different lens design. As noted from FIGS. 4A-1-4A-3, for the lenses having different add powers corresponding to the innovative lens design described herein, the area of the region having maximum residual cylinder power is reduced as compared to the lenses with the same add powers obtained using the other lens designs shown in FIGS. 4B-1-4B-3. The various isolines depicted in FIGS. 4A-1 to 4A-3 and 4B-1 to 4B-3 correspond to different residual cylinder powers. The innermost isoline corresponds to a residual cylinder power of 0.25 D. The residual cylinder power of the different isolines progressively increases from 0.25 D in increments of 0.25 D. The values on the horizontal axis in FIGS. 4A-1 to 4B-3 vary from −40 degrees to 60 degrees in increments of 10 degrees. The values on the vertical axis in FIGS. 4A-1 to 4B-3 vary from −40 degrees to 40 degrees in increments of 10 degrees.

FIGS. 5A-1-5A-3 are plots of the gradient of residual cylinder power that show the variation in the maximum gradient of residual cylinder power across the surface of different ophthalmic lenses providing different add powers based on the innovative lens design. FIGS. 5B-1-5B-3 are plots of the gradient of residual cylinder power that show the variation in the maximum gradient of residual cylinder power across the surface of different ophthalmic lenses providing different add powers based on another different lens design. As noted from FIGS. 5A-1-5A-3, for the lenses having different add powers corresponding to the innovative lens design described herein, the area of the region having maximum gradient of residual cylinder power is reduced as compared to the lenses with the same add powers obtained using the other lens design for lenses as shown in FIGS. 5B-1-5B-3. Additionally, a comparison of FIGS. 5A-1-5A-3 illustrates that for the lenses having the innovative lens design described herein, the gradient of residual cylinder power gradually increases as the optical add power increases to allow a patient to easily and comfortably adapt to different lenses with increasing add powers. The values on the horizontal axis in FIGS. 5A-1 to 5B-3 vary from −40 degrees to 60 degrees in increments of 10 degrees. The values on the vertical axis in FIGS. 5A-1 to 5B-3 vary from −40 degrees to 40 degrees in increments of 10 degrees.

FIGS. 6A-1-6A-3 show the variation in the power width of the near vision zone in different ophthalmic lenses providing different add powers based on the innovative lens design. FIGS. 6B-1-6B-3 show the variation in the power width of the near vision zone in different ophthalmic lenses providing different add powers based on another different lens design. It is noted from FIGS. 6B-1 to 6B-3 that the power width of the near vision zone in lenses based on the other lens design remains same or substantially same as the add power increases. In contrast, in lenses based on the innovative lens design discussed herein, the power width of the near vision zone increases with add power. A comparison of FIGS. 6A-1-6A-3 illustrates that the width of the near vision zone for younger presbyopes with low add power requirements is lower as compared to the width of the near vision zone for mature presbyopes having higher add power requirements consistent with the visual needs of young presbyopes and mature presbyopes. The various isolines depicted in FIGS. 6A-1 to 6A-3 and 6B-1 to 6B-3 correspond to a percentage (e.g., 25%, 50%, 75%) of the prescribed add power. The values on the horizontal axis in FIGS. 6A-1 to 6B-3 vary from −40 degrees to 60 degrees in increments of 10 degrees. The values on the vertical axis in FIGS. 6A-1 to 6B-3 vary from −40 degrees to 40 degrees in increments of 10 degrees.

Figure 7:
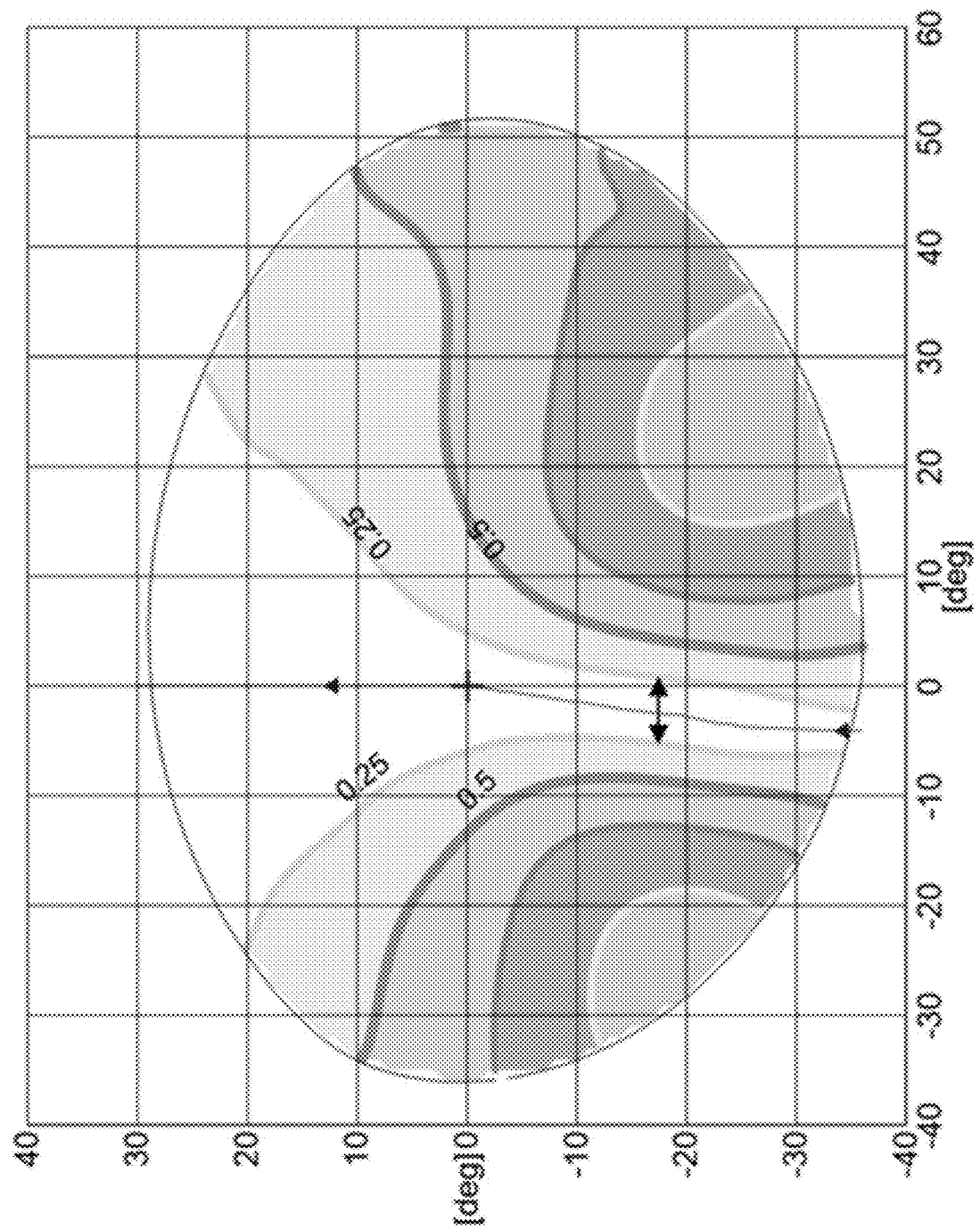
FIG. 7 is a residual cylinder plot that illustrates a method of measuring corridor width.
Figure 8:
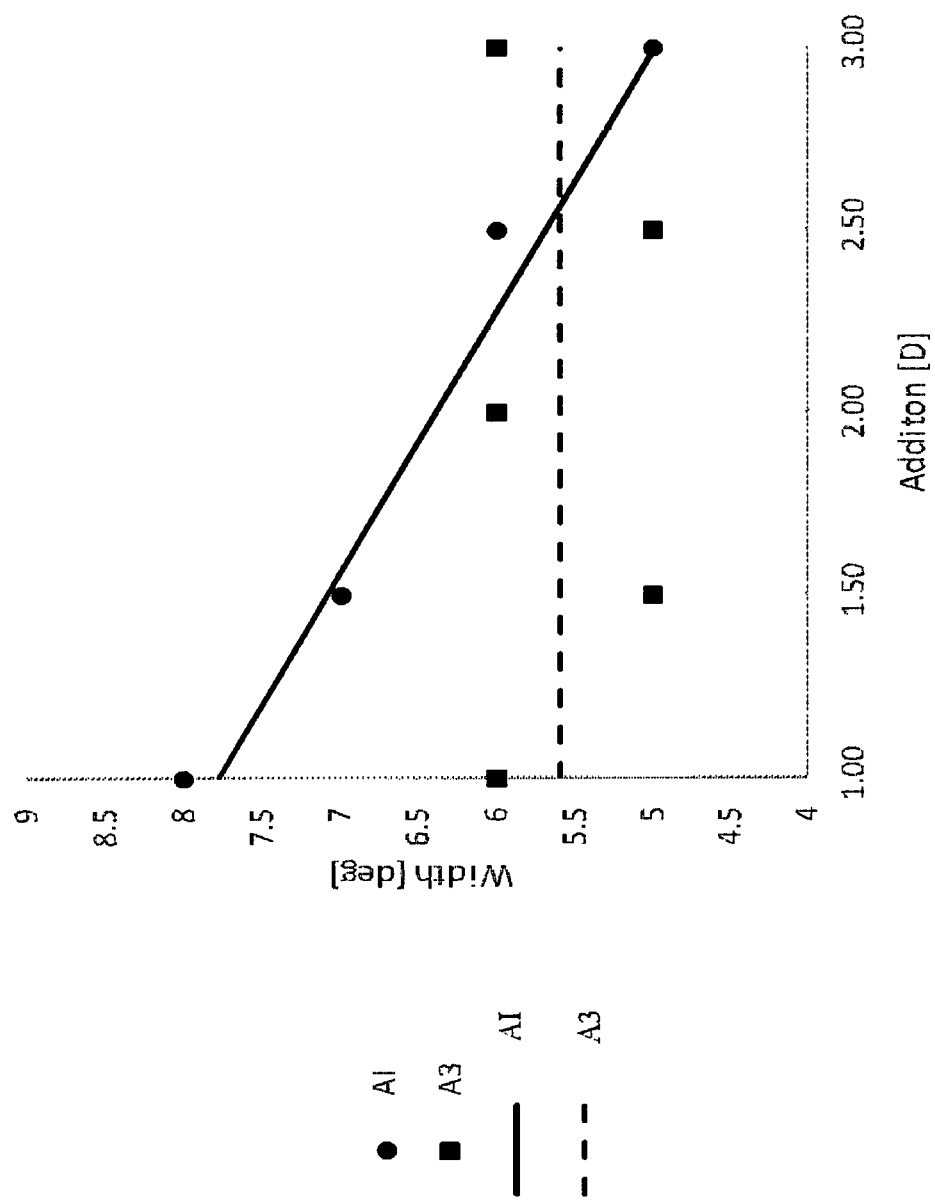
FIG. 8 illustrates the variation of the normalized corridor width with add power for different example ophthalmic lenses fabricated using the innovative lens design described herein as well as example ophthalmic lenses fabricated using another different lens design.

FIG. 8 graphically illustrates the comparison between the variation of the normalized corridor width for lenses based on the innovative design and lenses based on the other design. Without any loss of generality, the normalized corridor width can be equal to the minimum corridor width between the cylinder isolines that are 25% of the prescribed add power. For example, if the prescribed addition is 2.00 D, the reference cylinder isoline is 0.50 D, as illustrated in FIG. 7. If the prescribed addition, however, is 3.00 D, the reference cylinder isoline for measuring the corridor width is 0.75 D. The normalized width of the corridor for the example lens based on the innovative lens design illustrated in FIG. 7 is about 8-9 degrees of FOV or about 4-4.5 mm.

It should be noted, that the normalized corridor width is an example design parameter, defined during design time in order to meet a visual need. In the other design, (e.g. A3 in FIG. 8), the normalized corridor width remains generally or on average constant, regardless of the prescribed addition. However, in the innovative design (AI in FIG. 8), the normalized corridor width decreases from about 8 degrees of FOV (or about 4 min) to about 5 degrees of FOV (or about 2.5 mm) with increasing add power from 1.0 D to 3.0 D. Accordingly, the normalized corridor width may change by at least 1.5 degrees of FOV, at least 2.0 degrees of FOV, at least 2.5 degrees of FOV, at least 3.0 degrees of FOV, at least 3.5 degrees of FOV, or any value in a range/sub-range defined by these values. The normalized corridor width progressively decreases for at least 3, 4, 5 or more lenses with increasing add powers. For example, in the plot shown in FIG. 8, the normalized corridor width is bigger for add power of 1.0 D as compared to the normalized corridor width for add power of 1.5 D. As another example, in the plot shown in FIG. 8, the normalized corridor width is bigger for add power of 1.5 D as compared to the normalized corridor width for add power of 2.0 D. As yet another example, in the plot shown in FIG. 8, the normalized corridor width is bigger for add power of 2.5 D as compared to the normalized corridor width for add power of 3.0 D. Thus, the innovative lens design is different from the other lens design in that the design parameter varies with add power, and the design parameter is adjusted to change gradually and in certain implementations continually with increasing addition. In this example, it is important to note that if a young presbyope adjusted to an eyeglasses lens with a wide corridor, a significant decrease in corridor width might result in discomfort. However, a gradual reduction of the corridor width as the patient ages enables the presbyope to adjust to the new lens more comfortably.

Figure 9:
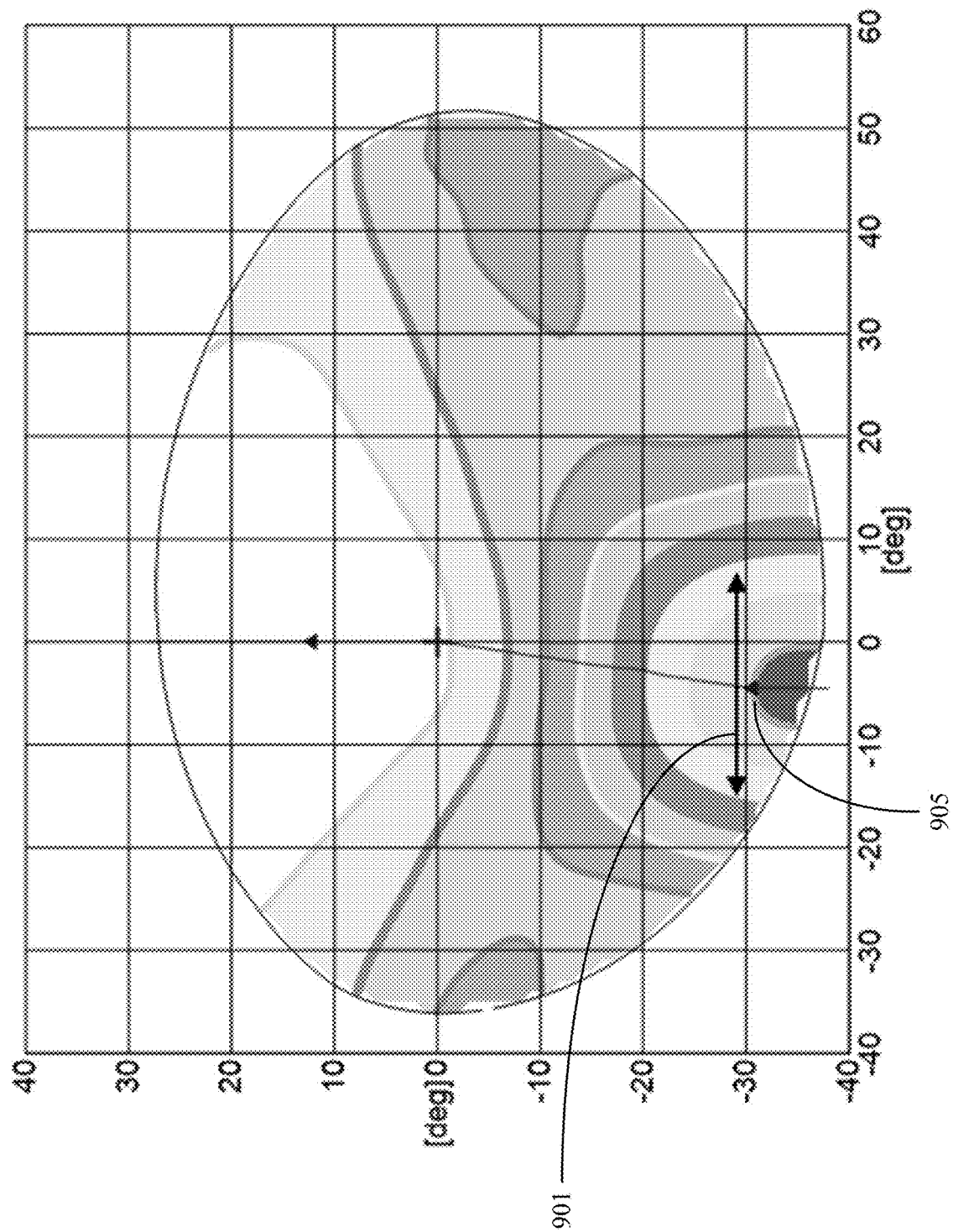
FIG. 9 is an addition power plot that illustrates a method of measuring near zone power width.
Figure 10:
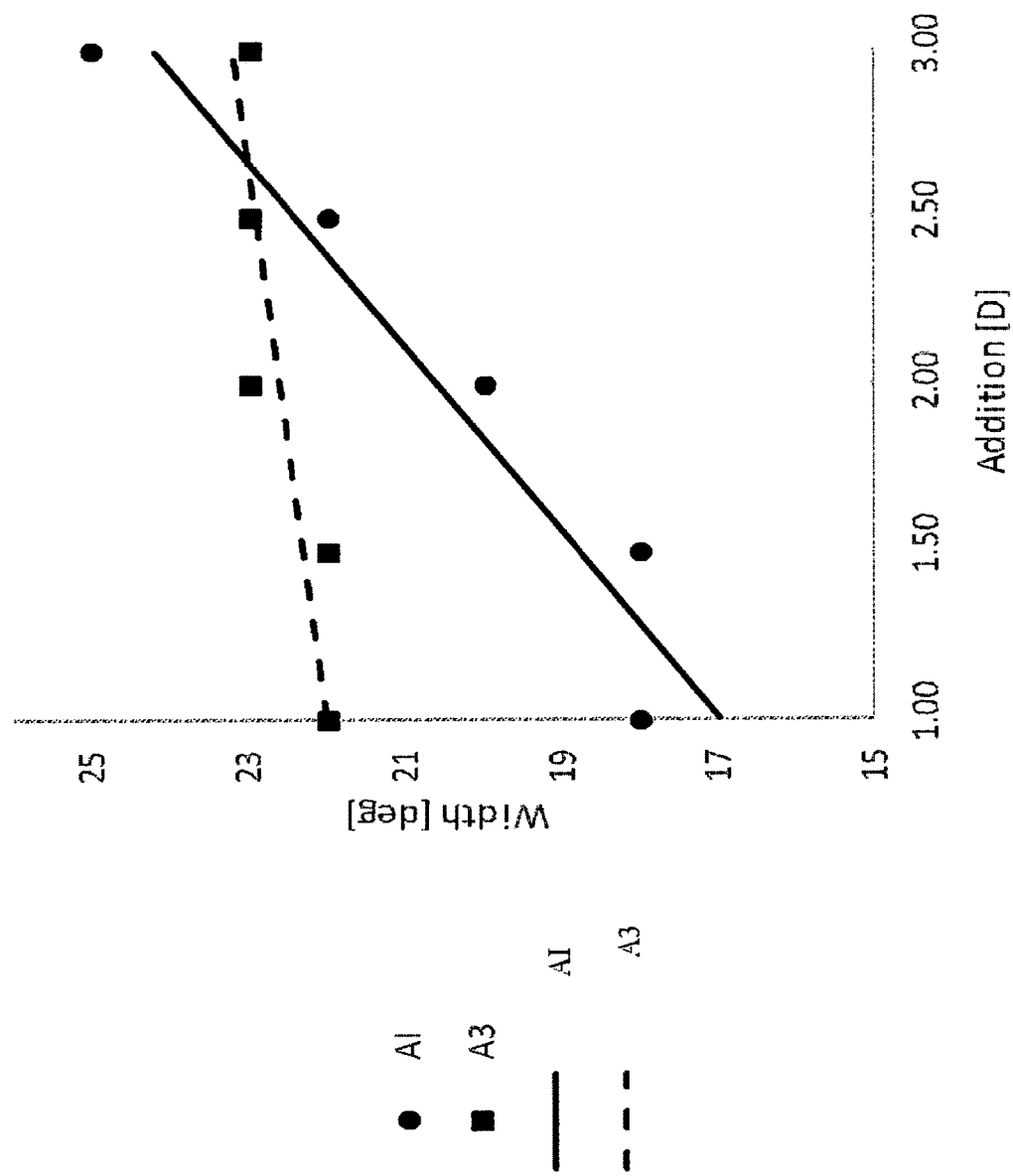
FIG. 10 illustrates the variation of the normalized near zone power width with add power for different example ophthalmic lenses fabricated using the innovative lens design described herein as well as example ophthalmic lenses fabricated using another different lens design.

FIG. 10 graphically illustrates the comparison between the variation of the normalized power width of the near zone for lenses based on the innovative design and lenses based on the other design. Without any loss of generality, the normalized power width of the near zone is equal to the horizontal width 901 through the NMP 905 between the power isolines that are 75% of the prescribed add power as illustrated in FIG. 9. As discussed above, the normalized power width and/or the normalized cylinder width of the near zone, the far zone or the corridor can be measured in terms of degrees of field of view (FOV). On an average, a width of 1 degree of field of view can be equal to about 0.5 mm on the back surface of the lens. The width measured in terms of degrees of field of view can be converted to a width in mm by using back vertex distance (BVD). Using BVD the mean gaze angle of the eye when it is looking at an object can be converted to a width in mm. In some implementations, BVD can correspond to the distance between the iris of the eye, e.g., the iris vertex or the cornea, e.g., vertex or apex of the cornea and the back surface of the lens. In such implementations, BVD can have a value of about 13 mm. In some other implementations, BVD can correspond to the distance between the center of rotation of the eye and the fitting point on the back surface of the lens. In such implementations, BVD can have a value equal to about 27 mm. For the example lens based on the innovative lens design illustrated in FIG. 9, the normalized power width of the near zone is about 13 degrees of FOV or about 6.5 mm.

It is noted that in various implementations the normalized power width of the near zone for lenses based on the innovative lens design (AI in FIG. 10) increases from about 18 degrees of FOV (or about 9 mm) for add power of 1.0 D to 25 degrees of FOV (or about 12.5 mm) for add power of 3.0 D. The normalized power width of the near zone increases by an amount greater than or equal to about 7% (e.g., greater than or equal to about 8%, greater than or equal to about 9%, greater than or equal to about 10%, greater than or equal to about 20%, greater than or equal to about 30%, greater than or equal to about 40% and/or greater than or equal to about 50%, less than or equal to about 60%, or any range/sub-range defined by any of these values) as the add power increases from about 1.0 D to about 3.0 D. Similarly, normalized power width of the near zone increases by an amount greater than or equal to about 7% (e.g., greater than or equal to about 8%, greater than or equal to about 9%, greater than or equal to about 10%, greater than or equal to about 11%, greater than or equal to about 12%, greater than or equal to about 13%, greater than or equal to about 14%, greater than or equal to about 15%, greater than or equal to about 20%, greater than or equal to about 30%, greater than or equal to about 40% and/or greater than or equal to about 50%, less than or equal to about 60%, or any range/sub-range defined by any of these values) for add powers between 1.0 D and 1.5 D, between 1.5 D and 2.5 D, between 1.5 D and 2.0 D, between 1.0 D and 2.0 D, between 2.0 D and 2.5 D, between 2.0 D and 3.0 D or any value in a range/sub-range defined by any of these values. In contrast, the increase in the normalized power width of the near zone for lenses based on an another lens design (e.g., A3 in FIG. 10) increases by an amount between about 1%-4% for add powers between about 1.0 D and about 3.0 D. Without any loss of generality, the gradient or slope of the curve of the normalized power width of the near zone versus add power for lenses based on the innovative lens design described herein can be greater than the gradient or slope of the curve of the normalized power width of the near zone versus add power for lenses based on other lens designs for add powers between 1.0 D and 3.0 D, between 1.5 D and 2.5 D, between 1.0 D and 2.0 D, between 2.0 D and 3.0 D or any value in a range/sub-range defined by any of these values.

Normalized cylinder width of the near zone can change with add power in various implementations of lenses based on the innovative lens design described herein. Without any loss of generality, the normalized cylinder width of the near zone can be equal to the horizontal width between the cylinder isolines at 75% of the prescribed add power. The variation and increases of the normalized cylinder width of the near zone with add power in various implementations of lenses based on the innovative lens design described herein can be similar to the variation of the normalized power width of the near zone with add power discussed above. For example, the normalized cylinder width of the near zone can increase with add power in various implementations of lenses based on the innovative lens design described herein. The change in the normalized cylinder width of the near zone with add power for lenses based on the innovative lens design described herein can be greater than the change in the normalized cylinder width of the near zone with add power for lenses based on other lens designs. Accordingly, the gradient or slope of the curve of the normalized cylinder width of the near zone versus add power for lenses based on the innovative lens design described herein can be greater than the gradient or slope of the curve of the normalized cylinder width of the near zone versus add power for lenses based on other lens designs for add powers between 1.0 D and 3.0 D, between 1.5 D and 2.5 D, between 1.0 D and 2.0 D, between 2.0 D and 3.0 D or any value in a range/sub-range defined by any of these values.

Figure 11:
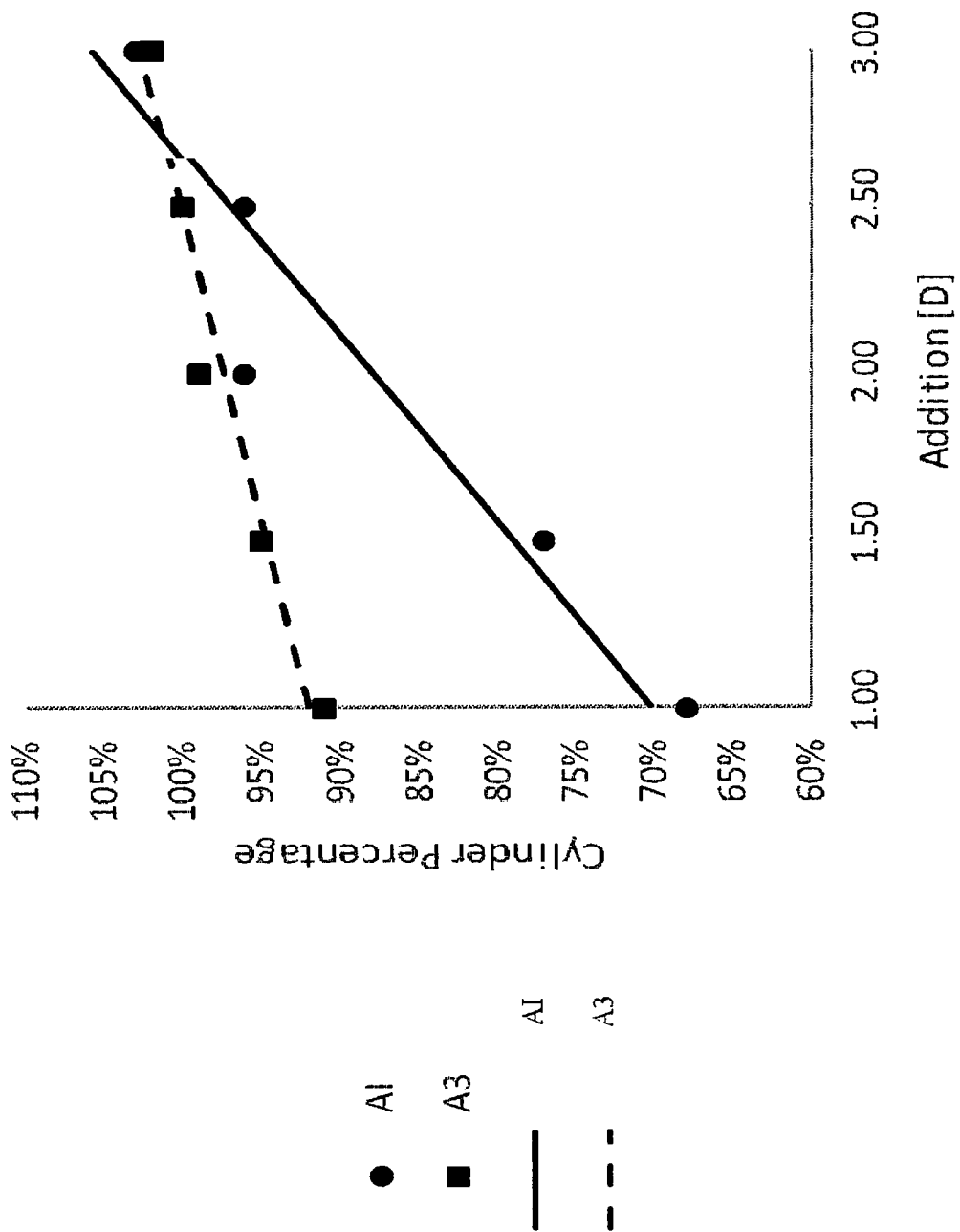
FIG. 11 shows the variation in the maximum residual cylinder power normalized to add power (e.g., by dividing by add power) with add power for different example ophthalmic lenses fabricated using the innovative lens design described herein as well as example ophthalmic lenses fabricated using another different lens design.

FIG. 11 graphically illustrates the comparison between the variation of the maximum cylinder divided by add power (also referred to as normalized maximum cylinder) for lenses based on the innovative design and lenses based on the other design. It is noted from FIG. 11 that in various implementations the maximum cylinder divided by add power for lenses based on the innovative design (e.g., AI in FIG. 11) increases by 30%-35% as add power increases from about 1.0 D to about 3.0 D. In contrast, the maximum cylinder divided by add power for lenses based on the other design (e.g., A3 in FIG. 11) may increase by about 10% as add power increases from about 1.0 D to about 3.0 D. Accordingly, in various implementations of lenses based on the innovative design (e.g., AI in FIG. 11) the normalized maximum residual cylinder power increases by at least 12%, at least 13%, at least 14%, at least 15%, at least 25%, at least 25%, at least 30%, at least 35%, at least 40%, at least 45%, at least 50%, or any range/sub-range between any of these values as add power increases from about 1.0 D to about 3.5 D or any add power between 1.0 D and 3.5 D (e.g., as add power increases between 1.0 D-1.5 D, between 1.5 D-2.0 D, between 2.0 D-2.5 D, between 2.5 D-3.0 D, between 1.5 D-2.5 D or between 2.0 D-3.0 D or any combination thereof). Accordingly, the slope of the curve of the normalized maximum residual cylinder power versus add power for lenses based on the innovative lens design described herein can be greater than the slope of the curve of the normalized maximum residual cylinder power versus add power for lenses based on other lens designs for add powers between 1.0 D and 3.0 D, between 1.5 D and 2.5 D, between 1.0 D and 2.0 D, between 2.0 D and 3.0 D or any value in a range/sub-range defined by any of these values.

Figure 12:
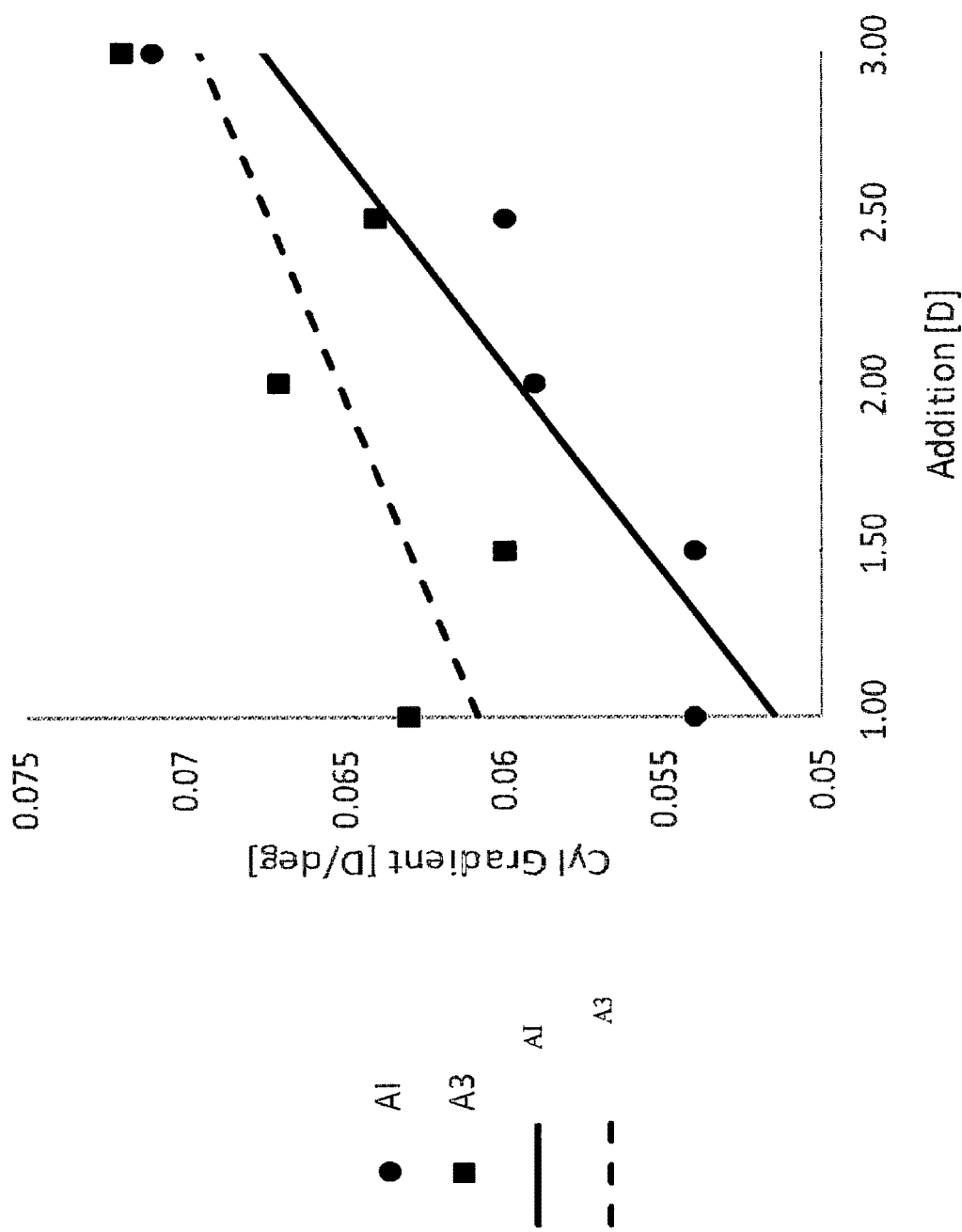
FIG. 12 shows the variation in the maximum gradient of the residual cylinder power normalized to add power with add power for different example ophthalmic lenses fabricated using the innovative lens design described herein as well as example ophthalmic lenses fabricated using another lens design.
Figure 13:
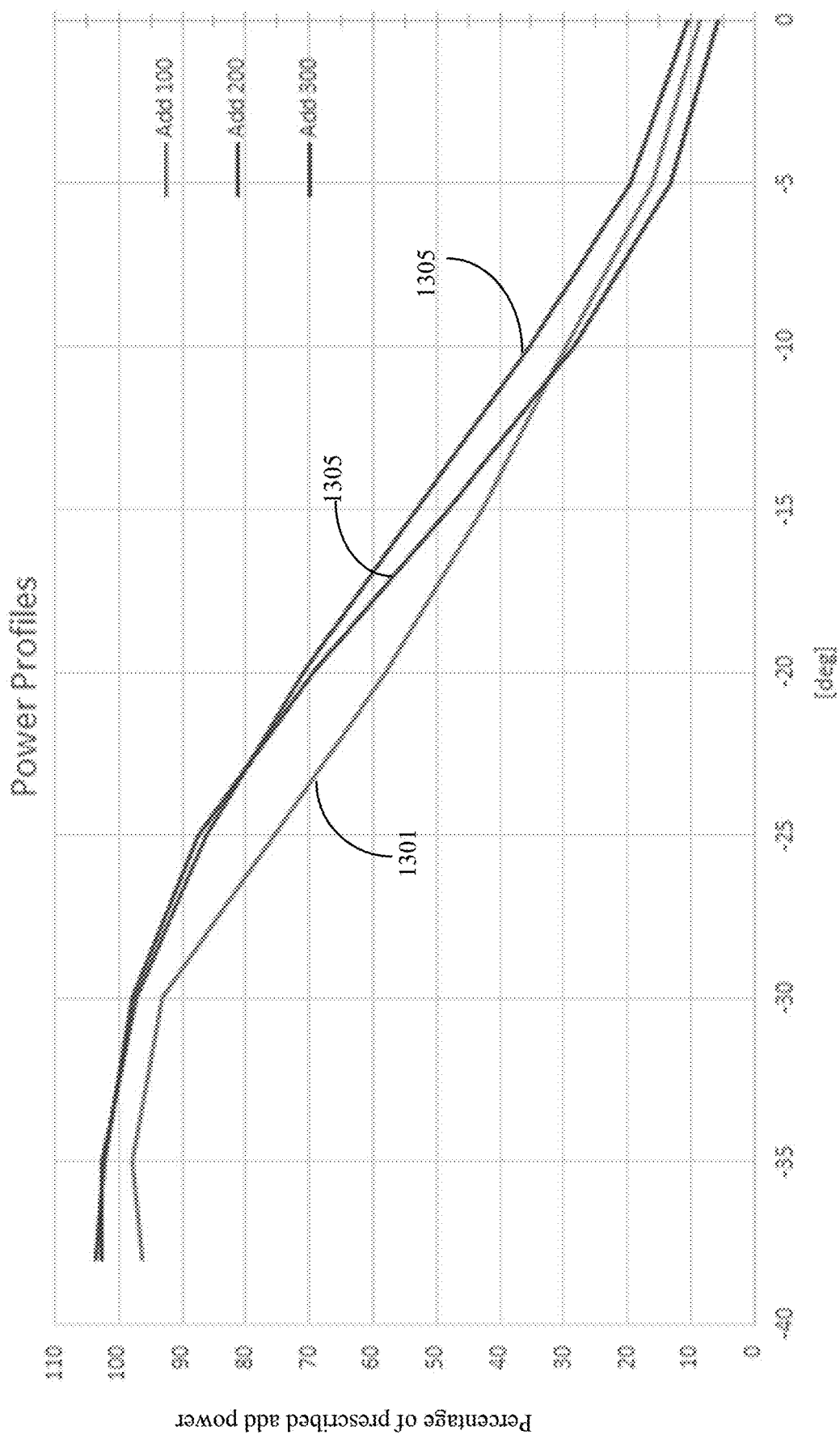
FIG. 13 shows the variation in the normalized addition profile along the eye path for example ophthalmic lenses fabricated using the innovative lens design.

FIG. 12 graphically illustrates the comparison between the variation of the normalized maximum cylinder gradient. The normalized maximum cylinder gradient is obtained by dividing the maximum cylinder gradient by the add power (also referred to as per add power) for lenses based on the innovative design and lenses based on the other design. It is noted that in various implementations the normalized maximum cylinder gradient is lower at lower add power for lenses based on the innovative design (e.g., AI in FIG. 12) as compared to the normalized maximum cylinder gradient for the same add power for lenses based on the other design (e.g., A3 in FIG. 12). As discussed above, reducing the maximum gradient of the residual cylinder in young presbyopes having lower add power can help young presbyopes to more easily adapt to progressive lenses with less discomfort as compared to adapting to lenses based on other lens designs that result in higher values for the maximum gradient of the residual cylinder. It is noted from FIG. 12 that the normalized maximum cylinder gradient in an example lens based on the innovative lens design is less than 0.055 for an add power of 1.0 D, is less than 0.055 for an add power of 1.5 D, is less than 0.0625 for an add power of 2.0 D, is less than 0.0625 for an add power of 2.5 D, is less than 0.72 for an add power of 3.0 D The normalized addition profiles per addition are illustrated in FIG. 13. The vertical axis in FIG. 13 corresponds to the percentage of prescribed add power. In FIG. 13, curve 1301 is the normalized addition profile for add power of 1.0 Diopter, curve 1303 is the normalized addition profile for add power of 2.0 Diopter and curve 1305 is the normalized addition profile for add power of 3.0 Diopter. Normalized addition profiles are the value of the percentage of the maximum addition reached, between the fitting point (FP) and the NMP along the convergence path. These normalized addition profiles represent the percentage of the full addition experienced by the user along the 'eye path', when the line of sight is transitioning between far and near vision. Both the length and gradient along the corridor can be characterized by these profiles. With the other design, the normalized addition profiles for different add powers would be the same or substantially the same and thus would overlap. However, as noted from FIG. 13, in various implementations of the innovative lens design, the normalized addition profiles for different add powers do not overlap. This feature is a significant difference between the innovative lens design and other lens designs. Referring to the FIG. 13, the normalized addition profile for add power of 1.0 Diopter represented by curve 1301 changes at a lower rate for field of view greater than −10 degrees (e.g., −5 degrees of FOV or 0 degrees of FOV) as compared to the rate of change of normalized addition profile for add power of 3.0 Diopter represented by curve 1305 for field of view greater than −10 degrees (e.g., −5 degrees of FOV or 0 degrees of FOV). This indicates that the normalized add power gradient along the convergence path is smaller for a lens configured to provide an add power of 1.0 D than the normalized add power gradient along the convergence path for a lens configured to provide an add power of 3.0 D.

As described above, this application contemplates an innovative lens design that can provide custom solutions to improve visual outcome for individuals of all ages. The optical solutions provided by the innovative lens design are customized for an individual and is based on the individual's add power (e.g., power required for correcting defects in the near vision). Additionally, various implementations of the innovative lens design contemplated in this application does not involve soliciting information regarding the individual's visual needs and/or lifestyle. Instead, the innovative lens design contemplated in this application, customizes the optical solution for an individual having a particular add power by taking into consideration the visual needs of a general population having that particular add power. The innovative lens designs contemplated in this application may rely on data representing the visual needs of people with different add powers to determine various surface characteristics (e.g., width of a far vision zone, width of a near vision zone, width of a corridor, maximum residual cylinder, maximum gradient of residual cylinder) of an optical lens that would meet the visual requirements of an individual having a certain add power. Using data reflecting the visual needs for a sample of general population having different optical add powers, the innovative lens design contemplated in this application may vary various optical parameters for increasing add power requirements of aging individuals. In various implementations, the innovative lens design contemplated in this application can gradually and in certain implementations continuously change the surface characteristics of the optical lenses having different addition to meet the changing add power requirements of individuals as they age and require more addition. The gradual evolution in the surface characteristics of the optical lens over time can increase the ease with which the individual adapts to a new optical lens customized for the new (e.g., higher) add power. Accordingly, one or more surface characteristics normalized to the add power (e.g., width of a far vision zone, width of a near vision zone, width of a corridor, maximum residual cylinder, maximum gradient of residual cylinder) of a first optical lens configured to provide a first add power fabricated using the innovative lens design contemplated in this application can be different from the one or more surface characteristics normalized to the add power (e.g., width of a far vision zone, width of a near vision zone, width of a corridor, maximum residual cylinder, maximum gradient of residual cylinder) of a second optical lens configured to provide a second add power different from the first add power and fabricated using the innovative lens design contemplated in this application. In contrast, the surface characteristics normalized to the add power in various lenses based on other lens designs may remain constant or near to constant or otherwise change less.

In some implementations, the lens design may be set forth in a database and/or a set of instructions that can be executed by an electronic processor and used to provide optical solutions based on the prescription including addition power for an individual. The lens design may improve visual outcome for patients of a wide range of ages suffering from visual defects.

The above presents a description of systems, devices, article of manufacture and methods contemplated for carrying out the concepts disclosed herein, and of the manner and process of making and using it, in such full, clear, concise, and exact terms as to enable any person skilled in the art to which it pertains to make and use this invention. The devices, article of manufacture and methods disclosed herein, however, are susceptible to modifications and alternate constructions from that discussed above which are within the scope of the present disclosure. Consequently, it is not the intention to limit this disclosure to the particular embodiments disclosed. On the contrary, the intention is to cover modifications and alternate constructions coming within the spirit and scope of the disclosure as generally expressed by the following claims, which particularly point out and distinctly claim the subject matter of embodiments disclosed herein.

Although embodiments have been described and pictured in an exemplary form with a certain degree of particularity, it should be understood that the present disclosure has been made by way of example, and that numerous changes in the details of construction and combination and arrangement of parts and steps may be made without departing from the spirit and scope of the disclosure as set forth in the claims hereinafter.

What is claimed is:

1. A method of producing a progressive ophthalmic lens having a far vision zone, a near vision zone and a corridor connecting the near and far vision zones, said method comprising:
    receiving a prescription including an optical add power for an individual; and
    selecting at least one optical design parameter of a surface of the progressive ophthalmic lens based on the prescribed optical add power,
    wherein the at least one optical design parameter comprises a normalized power width of the near vision zone, normalized based on the prescribed optical add power so as to correspond to a horizontal width between isolines corresponding to 75% of the prescribed optical add power, the normalized power width of the near vision zone increasing with the prescribed optical add power,
    wherein when the prescribed optical add power is greater than 2.0 D, the selected normalized power width of the near vision zone is about 7% to 20% greater than when the prescribed optical add power is less than 2.0 D.

2. The method of claim 1, wherein the method further comprises fabricating the progressive ophthalmic lens having the selected at least one optical design parameter.

3. A lens kit comprising:
    at least two lenses belonging to a single lens design, each of the at least two lenses comprising:
        a far vision zone;
        a near vision zone configured to provide an add power; and
        a corridor connecting the far vision zone and the near vision zone,
    wherein the at least two lenses comprises a first lens providing a first add power and a second lens providing a second add power, the second add power greater than the first add power, and
    wherein a normalized power width of the near vision zone, normalized based on add power so as to correspond to a horizontal width between isolines corresponding to a percentage of add power, for the second lens is about 7% to about 20% larger than a normalized power width of the near vision zone, normalized based on add power, of the first lens.

4. The lens kit of claim 3, wherein the second add power of the second lens is greater than 2.0 D and the first add power of the first lens is less than 2.0 D, wherein the normalized power width of the near vision zone corresponds to a horizontal width of the near vision zone between add power isolines at 75% of add power.

5. The lens kit of claim 3, wherein the second add power is greater than 2.0 D, the second lens has a normalized maximum cylinder power, normalized based on add power by dividing a maximum cylinder power by add power, that is about 15%-35% larger than a normalized maximum cylinder power, normalized based on add power, of the first lens, the first add power being less than 2.0 D.

6. The lens kit of claim 3, wherein the first add power is less than 2.0 D, the first lens has a normalized corridor width, normalized based on add power, that is greater than a normalized corridor width, normalized based on add power, of the second lens, the second add power being greater than 2.0 D, wherein the normalized corridor width corresponds to a minimum width of the corridor between cylinder isolines corresponding to 25% of add power.

7. The lens kit of claim 3, wherein a normalized width of the corridor, normalized based on add power, of the first lens of the at least two lenses having the first add power is greater than a normalized width of the corridor, normalized based on add power, of the second lens of the at least two lenses having the second add power greater than the first add power, wherein the normalized corridor width corresponds to a minimum width of the corridor between cylinder isolines corresponding to 25% of add power.

8. The lens kit of claim 7, wherein the first add power is less than 2.0 D and the normalized corridor width of the first lens is between 6-8 degrees of field of view (FOV).

9. The lens kit of claim 7, wherein the first add power is less than 2.0 D and the normalized corridor width of the first lens is between 3-4 mm.

10. The lens kit of claim 7, wherein the second add power is greater than 2.0 D and the normalized corridor width of the second lens is between 5-6.5 degrees of field of view (FOV).

11. The lens kit of claim 7, wherein the second add power is greater than 2.0 D and the normalized corridor width of the second lens is between 2.5 mm and 3.25 mm.

12. The lens kit of claim 3, wherein a normalized width of the far vision zone, normalized based on add power, changes with add power.

13. The lens kit of claim 12, wherein the normalized width of the far vision zone increases with add power.

14. A method of producing a progressive ophthalmic lens having a far vision zone, a near vision zone and a corridor connecting the near and far vision zones, said method comprising:
    receiving a prescription including an optical add power for an individual; and
    selecting a normalized power width of the near vision zone based on the prescribed optical add power, the normalized power width normalized based on the prescribed optical add power, the normalized power width of the near vision zone increasing with the prescribed optical add power, the normalized power width of the near vision zone corresponding to a horizontal width of the near vision zone between add power isolines at 75% of the prescribed optical add power,
    wherein when the prescribed optical add power is greater than 2.0 D, the selected normalized power width of the near vision zone is about 7% to 20% greater than when the prescribed optical add power is less than 2.0 D.

15. The lens kit of claim 3, wherein the second add power is greater than 2.0 D and the first add power less than 2.0 D.

16. The lens kit of claim 3, wherein the difference between the first add power and the second add power is 2.0 D.

* * * * *